United States Patent [19]
Ikegame

[11] Patent Number: 5,719,848
[45] Date of Patent: Feb. 17, 1998

[54] OPTICAL PICKUP SYSTEM WITH INDEPENDENTLY MOVABLE MULTIOPTICAL ELEMENTS

[75] Inventor: Tetsuo Ikegame, Tokyo, Japan

[73] Assignee: Olympus Optical Co., Ltd., Tokyo, Japan

[21] Appl. No.: 287,479

[22] Filed: Aug. 8, 1994

Related U.S. Application Data

[63] Continuation of Ser. No. 872,884, Apr. 23, 1992, abandoned.

[30] Foreign Application Priority Data

| Apr. 30, 1991 | [JP] | Japan | 3-124522 |
| Jul. 4, 1991 | [JP] | Japan | 3-164196 |
| Aug. 27, 1991 | [JP] | Japan | 3-215156 |

[51] Int. Cl.$^6$ ............................................. G11B 17/30
[52] U.S. Cl. ................................................. 369/219
[58] Field of Search ........................ 369/44.12, 44.14, 369/44.37, 44.38, 219, 215, 44.15, 44.16, 13, 58

[56] References Cited

U.S. PATENT DOCUMENTS

| 4,831,615 | 5/1989 | Goto et al. | 369/219 |
| 4,972,396 | 11/1990 | Rafner | 369/36 |
| 4,977,554 | 12/1990 | Hangai et al. | 369/215 |
| 5,043,964 | 8/1991 | Suzuki | 369/215 |
| 5,062,094 | 10/1991 | Hamada et al. | 369/44.37 |
| 5,189,661 | 2/1993 | Honda et al. | 369/215 |
| 5,193,080 | 3/1993 | Mohri et al. | 369/215 |
| 5,263,008 | 11/1993 | Fujio et al. | 369/13 |

FOREIGN PATENT DOCUMENTS

| 61-239449 | 10/1986 | Japan . |
| 62-40646 | 2/1987 | Japan . |
| 64-40646 | 2/1987 | Japan . |
| 62-69863 | 5/1987 | Japan . |
| 63-50924 | 3/1988 | Japan . |
| 63-304437 | 12/1988 | Japan . |
| 3-141035 | 6/1991 | Japan . |
| 4-366427 | 12/1992 | Japan | 369/44.15 |

OTHER PUBLICATIONS

Japanese Journal of Applied Physics, vol. 28 (1989) Supplement 28-3, pp. 335-340, "Acousto-Optic Accessing in Optical Disks", K. Matsumoto & T. Maeda.

*Primary Examiner*—Stuart S. Levy
*Assistant Examiner*—Allen Cao
*Attorney, Agent, or Firm*—Frishauf, Holtz, Goodman, Langer & Chick

[57] ABSTRACT

An optical pickup system for supporting a plurality of objective lenses, which irradiate light spots on an optical disc having tracks, to guide and move the objective lenses in a tracking and a focus direction, comprises a first and a second optical pickups each having an objective lens, the two objective lenses arranged in order along tracks of the optical disc, and first to third support mechanisms, the first and second support mechanisms cooperating to support the objective lens of the first optical pickup, the second and third support mechanisms cooperating to support the objective lens of the second optical pickup.

17 Claims, 15 Drawing Sheets

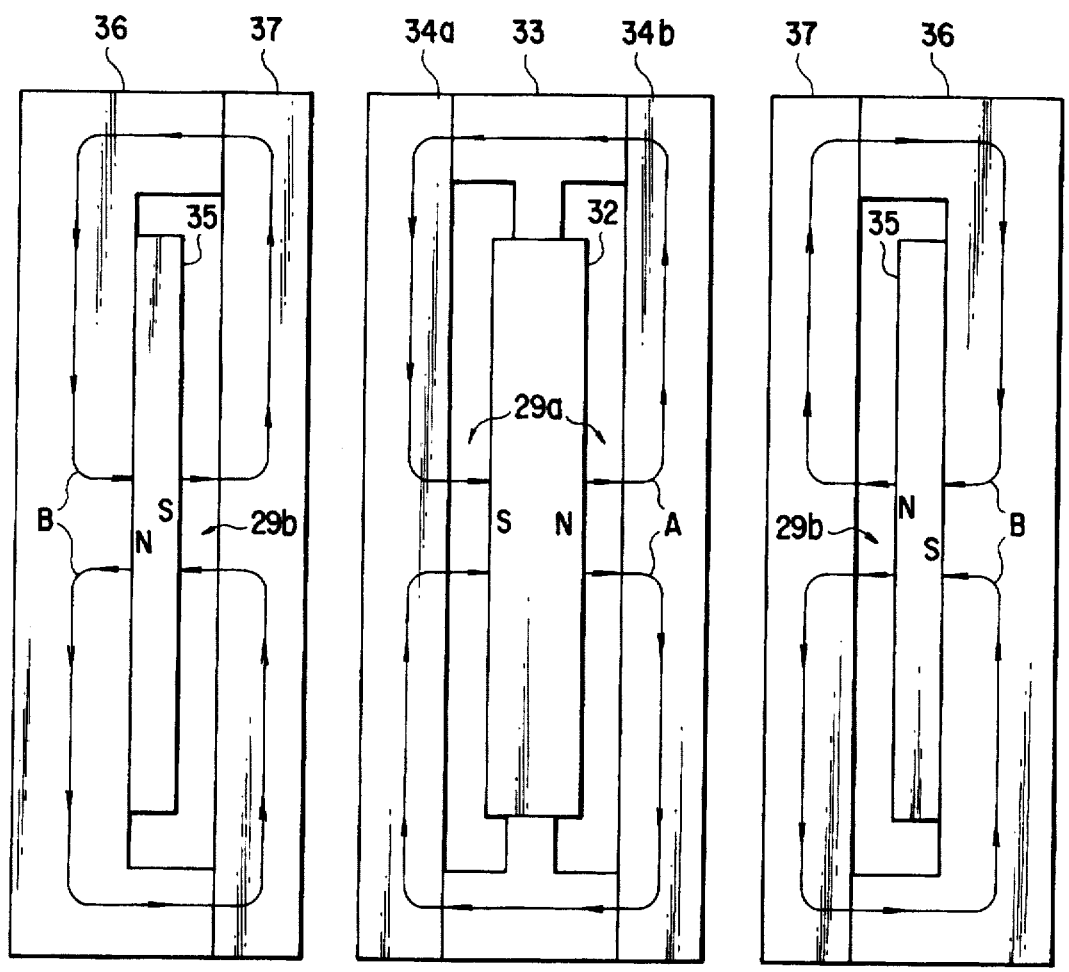
FIG. 4

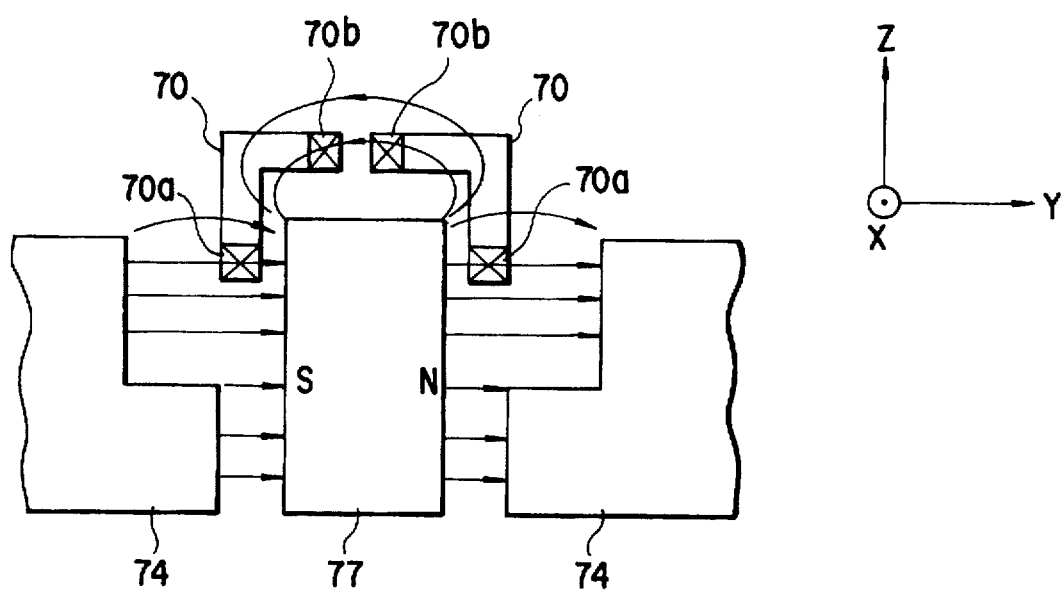
F I G. 11

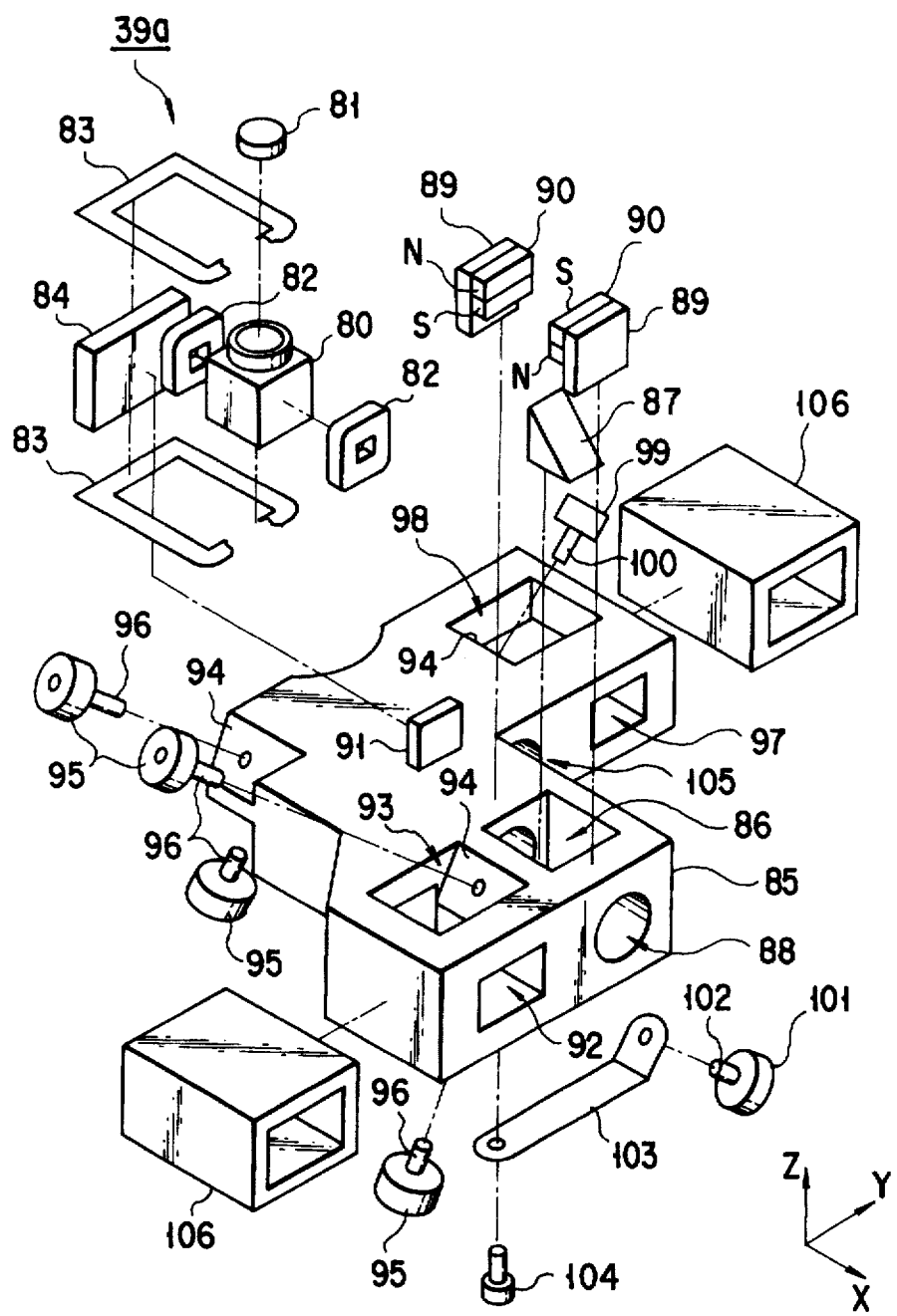
F I G. 12

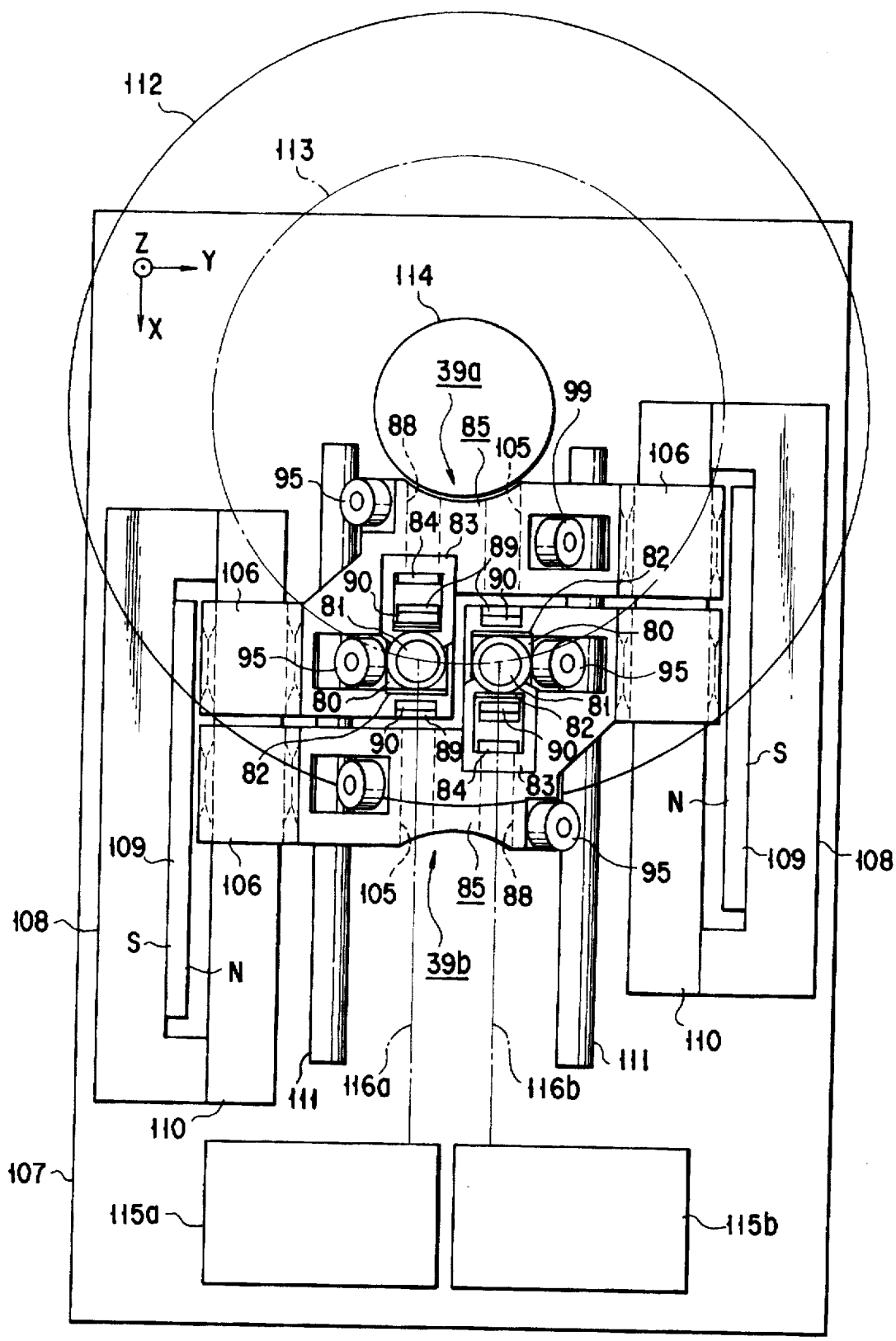
F I G. 13

OPTICAL PICKUP SYSTEM WITH INDEPENDENTLY MOVABLE MULTIOPTICAL ELEMENTS

This application is a continuation of application Ser. No. 07/872,884, filed Apr. 23, 1992, now abandoned.

BACKGROUND OF THE INVENTION

1. Field of the Invention

The present invention relates to an optical pickup, and, more particularly, to a system comprising a plurality of optical pickups. The optical pickup is used in an optical information recording/reproducing apparatus which records information on or reproduces information from an optical information storage medium such as an optical disc.

2. Description of the Related Art

An optical pickup system of a known type, which uses a plurality of optical pickups for a single optical disk, is disclosed in, for example, Japanese Unexamined Patent Publication No. 40646/87. FIG. 14 illustrates the structure of this optical pickup system.

This system comprises four optical pickups 120a to 120d. Those optical pickups 120a to 120d are designed to be independently movable in the radial direction of an optical disk or in the tracking direction, and are arranged radially to the rotational center 121 of the optical disk.

Generally, an information storage medium such as an optical disc is retained in a cartridge to protect the surface of the medium or facilitate its handling. FIG. 15 is a plan view showing the structure of a typical cartridge.

As shown in FIG. 15, a window 123 is formed on one side of the cartridge 122. A light beam is irradiated through this window 123 onto the recording surface of the information storage medium for information recording/reproduction.

Since the optical pickup system shown in FIG. 14 has the four optical pickups 120a–120d arranged radially at nearly equal intervals, it cannot be adapted for use for a storage medium which is housed in such an ordinary cartridge having a single window 123 as shown in FIG. 15. As the optical pickups 120a to 120d occupy large space in the recording/reproducing apparatus, this optical pickup system cannot contribute to downsizing the recording/reproducing apparatus.

To make the apparatus compact in such a case, multiple optical pickups should be arranged close to one another in the direction along the tracks of the storage medium (tangential direction). It is also necessary to reduce the tangential size of each optical pickup in order to shorten the distances between multiple optical elements which irradiate light beams.

Each optical pickup, however, needs a magnet and a coil to move the optical element and a guide rail to guide the associated optical pickup in the tracking direction. This makes it difficult to reduce the tangential size of the optical pickup.

An optical pickup whose tangential size is made smaller is disclosed in, for example, Japanese Unexamined Patent Publication No. 50924/88. FIG. 16 presents a perspective view showing the structure of this optical pickup.

This optical pickup has an objective lens 124, mounted on a carriage 125. This carriage 125 is guided in the tracking direction by guide rails 126 and 127. The carriage 125 is electromagnetically moved by a moving mechanism, which comprises a magnet 128, a focus coil 129 and a tracking coil 130.

The moving mechanism and the guide rails 126 and 127 are laid out the former above the latter as shown in FIG. 16. It is apparent that the tangential size of the optical pickup is made smaller.

If a plurality of optical pickups of this type, for example, two optical pickups, are arranged in the tangential direction to constitute an optical pickup system, two moving mechanisms are arranged side by side adjacent to each other in the tangential direction. The space between two objective lenses is therefore inevitably large, and cannot be made narrower. If one tries to apply this optical pickup system to the cartridge shown in FIG. 14, the two objective lenses may not be set within the window 123.

In addition, at least one light spot of the two objective lenses is shifted in the tangential direction from a line passing through the center of the circular track and parallel to the moving direction of the tracking direction of the optical pickup. Therefore, an angle, which is made by the tangential direction and the moving direction of the optical pickup at a point where the light spot is irradiated on the disc, is changed in two cases, in one case the optical pickup being moved inwardly in the radial direction of the disc and in the other case the optical pickup being moved outwardly in the radial direction of the disc. The degree of angular variation increases with the distance between the spot and the above-described line increasing. The occurrence of such a large angular variation makes a track error signal easily change.

SUMMARY OF THE INVENTION

It is, therefore, an object of the present invention to provide an optical pickup system which can perform random and high-speed access and can be adapted for use with an optical storage medium that is accommodated in a typical cartridge.

According to one aspect of the present invention, there is provided an optical pickup system for supporting a plurality of optical elements for irradiating light spots on an optical storage medium in such a way as to guide and move the optical elements in a tangential and a focus direction, comprising:

a first optical pickup having a first optical element;

a second optical pickup having a second optical element, the first and second optical pickups arranged in order along tracks of the optical storage medium; first support means;

second support means; and third support means, the first and second support means cooperating to support the first optical pickup, the second and third support means cooperating to support the second optical pickup.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a top view of a magnetic circuit which acts on a carriage coil shown in FIG. 1;

FIG. 11 is a view of magnetic lines of force which act on a focus coil of the system shown in FIG. 9;

FIG. 12 is an exploded perspective view partially showing an optical pickup system according to the fourth embodiment of the present invention;

FIG. 13 is a top view of the system shown in FIG. 12;

DETAILED DESCRIPTION OF THE PREFERRED EMBODIMENTS

The first embodiment of the present invention will now be described referring to FIGS. 1 to 4.

The X direction is a tracking direction, the Y direction a tangential direction and the Z direction a focus direction. For the sake of explanation, the arrow in the X-direction indicates forward, the Y-direction arrow right and the Z-direction arrow upward.

Figure 1:
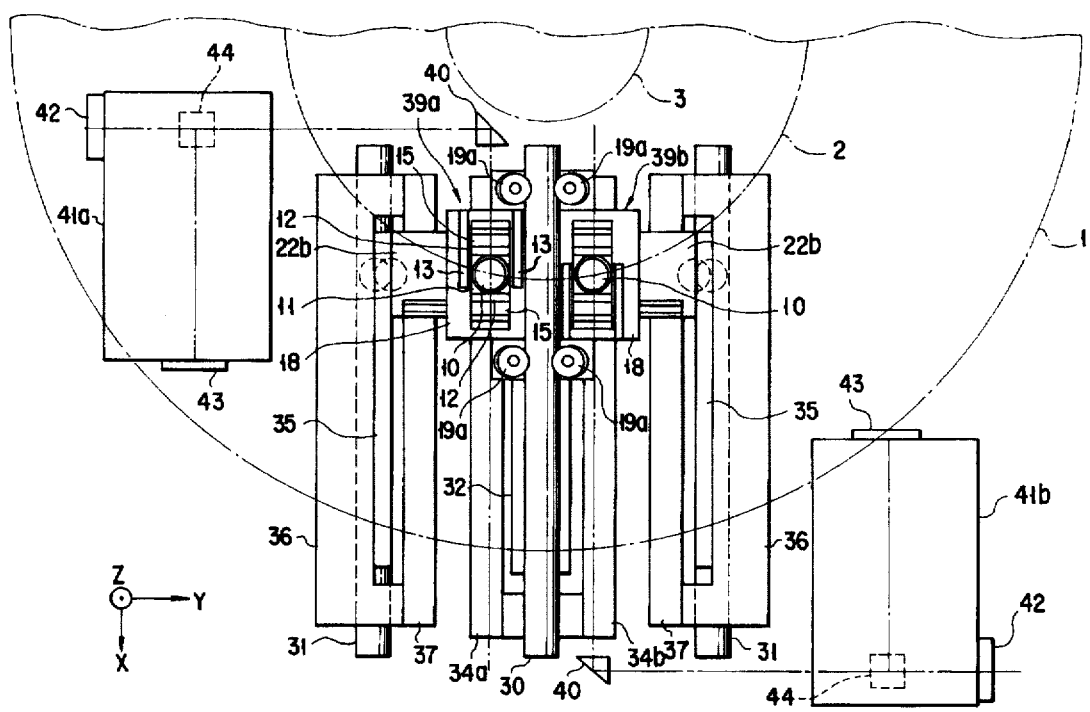
FIG. 1 is a top view of an optical pickup system according to the first embodiment of the present invention.

As shown in FIG. 1, the optical pickups system of this embodiment comprises first and second optical pick-ups 39a and 39b which are arranged along Y-direction. The first and second optical pickups 39a and 39b are constituted to be movable along the radial direction (X direction) of an optical disk 1. Two fixed optical systems 41a and 41b are located on the both sides of the optical pickups 39a and 39b. The fixed optical systems 41a and 41b eject light beam which is guided to the pickups 39a and 39b and irradiates on a track 2 of the optical disk 1 through objective lenses 10 provided in the respective optical pickups 39a and 39b, thereby recording/reproducing information. A reference numeral "3" denotes a spindle motor to rotate the optical disk 1.

Since the optical pickups 39a and 39b have the same structure, the following explanation will be given only of the first pickup 39a.

Figure 2:
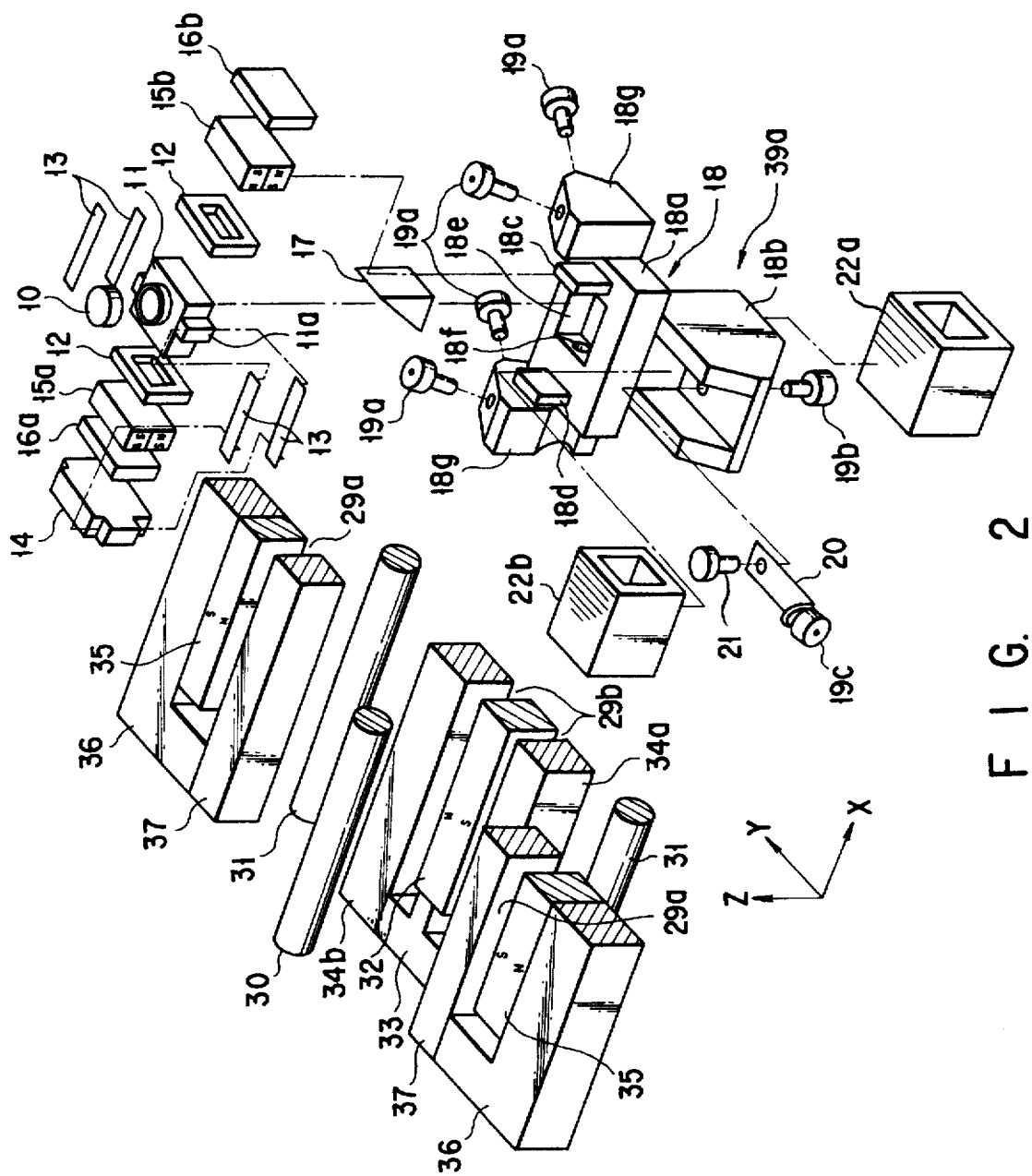
FIG. 2 is an exploded perspective view partially showing the system shown in FIG. 1.

As shown in FIG. 2, the objective lens 10 is supported by a lens holder 11, and two focus coils 12 wound square-like are fixed respectively to the side surfaces of the lens holder 11 in the X direction, i.e., the front and rear surfaces thereof. Two projections 11a are formed on the respective side surfaces (right and left surfaces) of the lens holder 11. The base ends of four springs 13 are attached to the upper and lower surfaces of the projections 11a, respectively. The springs 13 extend in parallel to one another with their distal ends fixed to the upper or lower surfaces of a holding member 14. The lens holder 11 is therefore supported slidable in the Z direction (focus direction). The springs 13 used here are, for example, a beryllium copper thin plate of about 0.1 mm coated by butyl rubber to remove dumping.

Figure 3:
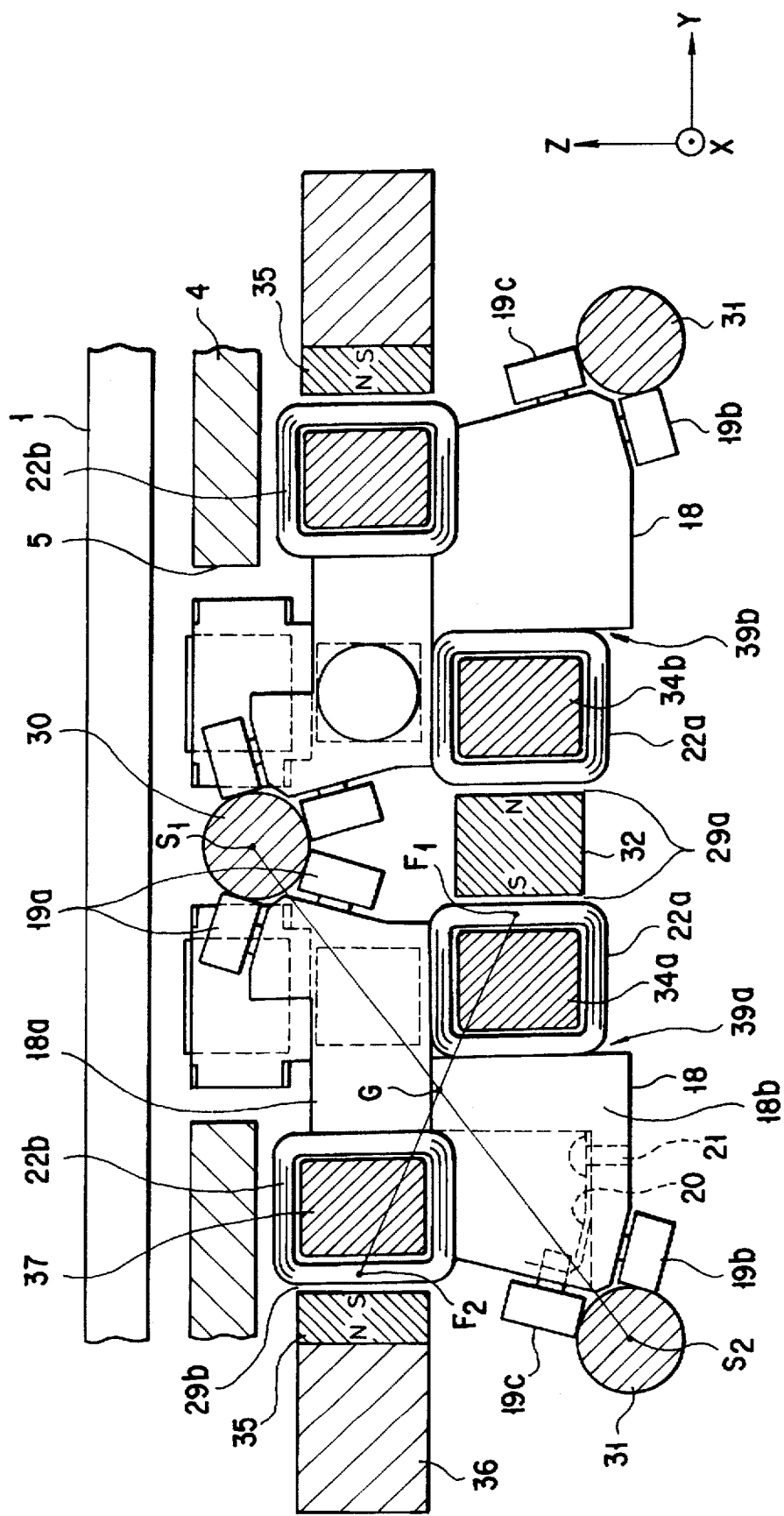
FIG. 3 is a cross section of the system shown in FIG. 1.

A carriage 18 includes first and second holding sections 18a and 18b which are positioned tilted to the horizontal as shown in FIG. 3.

Projections 18c and 18d are formed on the top surface of the first holding section 18a. The holding member 14 is fixed to the front surface of the front projection 18c, and the lens holder 11 is positioned between the projection 18c and 18d. There is one clearance between the front surface of the lens holder 11 and the projection 18c, and another clearance formed between the rear surface of the lens holder 11 and the front surface of the projection 18d. Between these clearances, two magnets 15a and 15b, two yokes 16a and 16b are located. The yokes 16 are made of iron plates.

The front surface of the front yoke 16a is attached to the rear face of the projection 18c, and the rear face of the other yoke 16b is attached to the front face of the projection 18d.

The front surface of the front magnet 15a is fixed to the rear faces of the front yoke 16a, while the rear surface of the rear magnet 15b is fixed to the front surface of the rear projection 16b. The magnets 15a and 15b are magnetized to respectively have two holes in the Z direction, providing the different poles of the magnets 15a and 15b opposite to each other. The upper and lower poles of the magnets 15a and 15b correspond to the upper and lower sides of the focus coils 12.

An opening 18e is formed in the center of the first holding section 18a of the carriage 18. A mirror 17 is fitted on the bottom surface of the opening 18e. A throughout hole 18f is made in the first holding section 18a, communicating with the opening 18e. Through this throughout hole 18f, the light beam from the fixed optical system 41a (shown in FIG. 1) is guided to the mirror 17. The light beam, after being reflected by the mirror 17, is guided upward to the objective lens 10.

Two first fitting sections 18g are provided on the front and rear sides of the first holding section 18a of the carriage 18. Two bearings 19a are pressed and fitted into the respective first holding sections 18b.

The bearings 19a abut upon a reference guide rail 30 shown in FIG. 3, and are located to hold the guide rail 30. As shown in FIG. 3, the reference guide rail 30 has a guide axis S1 extending in the X direction, and is located between the carriages 18 of the optical pick-ups 39a and 39b.

Two sub guide rails 31 are provided on the sides of the respective carriages 18. Each of the sub guide rails 31 has a guide axis S2 extending in the X direction. A line S1–S2 between the guide axes S1 and S2 inclines with respect to the horizontal.

As shown in FIG. 3, the individual sub guide rail 31 abuts upon the bearing 19b and a single pressure bearing 19c. The bearing 19b is pressed and attached to the lower side of the bottom of the second holding section 18b of the carriage 18. The bearing 19c is fixed to the distal end of a stainless steel spring 20. The base end of the spring 20 is securely fixed to the upper side of the bottom of the second holding section 18b by a machine screw 21.

The four bearings 19a abut upon the reference guide rail 30, and the bearings 19b and 19c abut on the sub guide rail 31, so that the carriages 18 are guided slidable in the X direction along the guide rails 30 and 31.

A carriage coil 22b of the second pickup 39b and a magnet 35 in FIG. 3 constitute a first moving means, and the bearings 19b and 19c of second pickup 39b and the sub guide rail 31 constitute a first guiding means. The first moving means and the first guiding means constitute a first support means.

Carriage coils 22a of the first and second optical pickups 39a and 39b and a magnet 32 constitute a second moving means. The reference guide rail 30 and the four bearings 19a constitute a second guiding means. The second moving means and the second guiding means constitute a second support means.

Further, the carriage coil 22b of the first pickup 39a and the magnet 35 in FIG. 3 constitute a third moving means. The bearings 19b and 19c of the first pickup 39a, and the sub guide rail 31 constitute a third guiding means. The third in moving means and the third guiding means constitute a third support means.

The carriage 18 has the carriage coils 22a and 22b. The carriage coil 22a contacts the right surface of the second holding section 18b and the lower surface of the first holding section 18a. The carriage coil 22b contacts the upper surface of the second holding section 18b and the left surface of the first holding section 18a. The line between the coils 22a and 22b crosses the line between the reference guide rail 30 and the sub guide rail 31.

The magnet 32 is located on the right side of the carriage coil 22a. The magnet 32 is shaped like a thin, long rod which extends in the tracking direction. As shown in FIG. 4, two T-shaped yokes 33 are attached to the front and rear ends of the magnet 32. Both ends of a rod yoke 34a are attached to the left side of the yokes 33. The rod yoke 34a is loosely inserted in the carriage coil 22a. As shown in FIG. 3, therefore, the yoke 34a faces the magnet 32, thus forming a magnetic gap 29a in between. The magnetic gap 29a electromagnetically acts on one side of the carriage coil 22a.

The ends of another rod yoke 34b are attached to the right surface of the yokes 33 as shown in FIG. 4. The magnet 32, and three yokes 33, 34a and 34b constitute a magnetic circuit A. The magnetic circuit A starts from the magnet 32 to the yoke 34b to the yoke 33 to the yoke 34a to the magnet 32 again.

The magnet 35 is located on the left side of the carriage coil 22b. The magnet 35 is shaped like a thin, long rod which extends in the tracking direction. The magnet 35 is attached to the right surface of a U-shaped yoke 36. Both ends of a long rod yoke 37 is fixed to the both ends of the yoke 36. The yoke 37 is loosely inserted in the carriage coil 22b as shown in FIG. 3. The yoke 37 therefore faces the magnet 35, thus forming a magnetic gap 29b in between. The magnetic gap 29b electromagnetically acts on one side of the carriage coil 22b.

The magnet 35, and the yokes 36 and 37 constitute a magnetic circuit B as shown in FIG. 4. The magnetic circuit B starts from the magnet 35 to the yoke 37 to the yoke 36 to the magnet 35 again.

The thicknesses of the magnets 32 and 35 are determined so that the magnetic flux density of the magnetic gap 29a is equal to that of the magnetic gap 29b.

In this embodiment, since the optical pickups 39a and 39b are structured the same and provided opposite to each other, both pickups commonly use the reference guide rail 30 and the magnet 32 which constitutes the magnetic circuit A electromagnetically acting on the carriage coil 22a.

As shown in FIG. 3 illustrating the front view of the optical pickup 39a, the point where a line F1–F2 crosses the line S1–S2 is present inside the carriage 18, and is passing through the center of gravity G of the optical pickup 39a. The line F1–F2 runs between points of action F1 and F2 where electromagnetic force is acting on the carriage coils 22a and 22b. The line S1–S2 runs between the guide axis S1 of the reference guide rail 30 and the guide axis S2 of the sub guide rail 31. Under these conditions, if the optical pickup 39a moves in the tracking direction (X direction), the moment of Y axial rotation will not occur, and nor will resonance easily occur. It is most preferable that the cross point passes the center of gravity G of the optical pickup 39a; however, even if it is shifted a little, the rotational moment is very small and resonance is difficult to occur, compared with the conventional case.

Moreover, since the guide rails 30 and 31 for supporting the carriages 18 are not located in the X-Y plane where the tangential direction lies, a distance in the tangential direction can be shortened, minimizing the size of the optical pickup.

The optical pickups 39a and 39b are mounted on the base (not shown), on which a spindle motor 3 for rotating the optical disk 1, the fixed optical systems 41a and 41b, the guide rails 30 and 31, and the yokes 33, 34a, 34b, 36 and 37 are fixed.

The two fixed optical systems 41a and 41b with the same structure are fixed onto the base in the directions opposite to each other. As shown in FIG. 1, the fixed optical systems 41a and 41b each include a laser device 42, a photosensor 43 and a beam splitter 44.

The action of this embodiment will now be described referring to FIGS. 1 to 3. The light beam generated from the laser 42 in each of the fixed optical systems 41a and 41b is reflected by a galvano mirror 40, and enters the mirror 17 (see FIG. 2) provided in the opening 18e of the carriage 18. The reflected light from the mirror 17 is guided to the objective lens 10, by which that light is focused and projected as a light spot on the disk 1. The light beam reflected on the disk 1 again passes through the objective lens 10, is reflected by the mirror 17 and the galvano mirror 40. Then the beam splitter 44 provided in each of the fixed optical system 41a and 41b bends the light path so that the light beam enters the photosensor 43.

As shown in FIG. 3, the two objective lenses 10, the reference guide rail 30 and the bearings 19a position in the window 5 formed in the cartridge 4 of the optical disk 1.

When a current flows in the focus coils 12 shown in FIGS. 1 and 2 with the above-described arrangement, the current and magnetic fields which occur between the two poles of the magnets 15 electromagnetically act on each other to produce force in the focus coils 12 in the focus direction (Z direction). As a result, the springs 13 are deformed and the lens holder 11 moves in the focus direction.

When a current flows through the carriage coils 22a and 22b, the current and the magnetic fields of the magnets 32 and 35 act on each other to generate force in the carriage coils 22a and 22b in the X direction, so that the optical pickups 39a and 39b move along the guide rails 30 and 31 in the tracking direction.

As described above, the two objective lenses 10 are fitted in the window 5 of the cartridge 4. Those objective lenses 10 can be used for information recording/reproduction to an information storage medium loaded in a conventional typical cartridge, and facilitates random and fast access. Further, since the guide rail 30 and the magnet 32 are used in common by the two optical pickups, the distance between the two objective lenses becomes shorter, thereby minimizing the size of the optical pickup system.

Moreover, the two optical pickups use in common the guiding means for guiding the carriages in the tracking direction and the moving means for moving the carriages in the tracking direction, resulting in fewer components being required and reduction of the manufacturing cost.

All pairs of devices, including the carriages on which the objective lenses of two optical pickups are mounted, have the same shape and are provided to be facing in opposite directions, so that the manufacturing cost is reduced. As the carriages have the same shape, the reference guide member can be shared and the accuracy of the mutual positions of the carriages can be improved.

Further, since two objective lenses are shifted from the move centers of respective carriages to be close to each other, it is possible that the distance between two objective lenses becomes shorter than the conventional cases.

A modification of the first embodiment will now be described.

In the first embodiment, as shown in FIG. 1, the left fixed optical system 41a is provided in back, and a light beam is guided from the spindle motor 3 to the optical pickup 39a. The right fixed optical system 41b is located at the front, and a light beam is guided from the external side of the optical disk to the optical pickup 39b.

Figure 5:
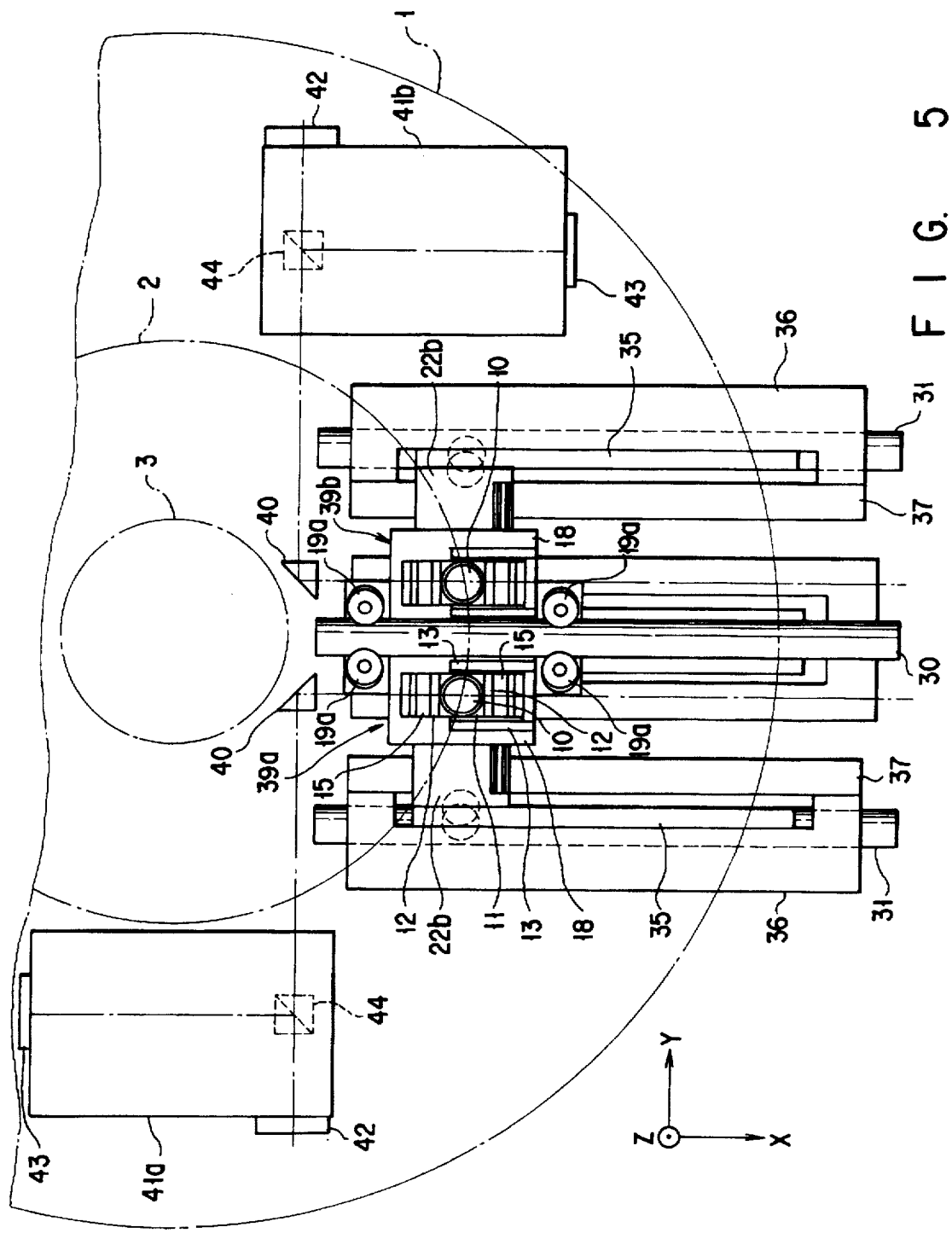
FIG. 5 is a top view of a modification of the first embodiment.

In the modification, as shown in FIG. 5, both fixed optical systems 41a and 41b are provided in front, and a light beam is guided from the spindle motor 3 to the optical pickups 39a and 39b. In this modification, since both fixed optical systems 41a and 41b can be positioned closer to the center of the optical disk 1, this facilitates the downsizing of a recording/reproducing apparatus.

In this modification, the mirrors 17 in the openings 18e are provided opposite to each other. The holding members 14 are fixed respectively on the projections 18c and 18d of the carriages 18 in the opposite directions. If the through hole 18f of the lens holding section 18a shown in FIG. 2 is formed on either side of each opening 18e, the recording/reproducing apparatus can be easily manufactured.

The second embodiment will be described referring to FIGS. 6 to 8. In the description to follow, the same reference numerals are used to designate the same members as in the first embodiment, and only different portions or members will be explained.

Figure 6:
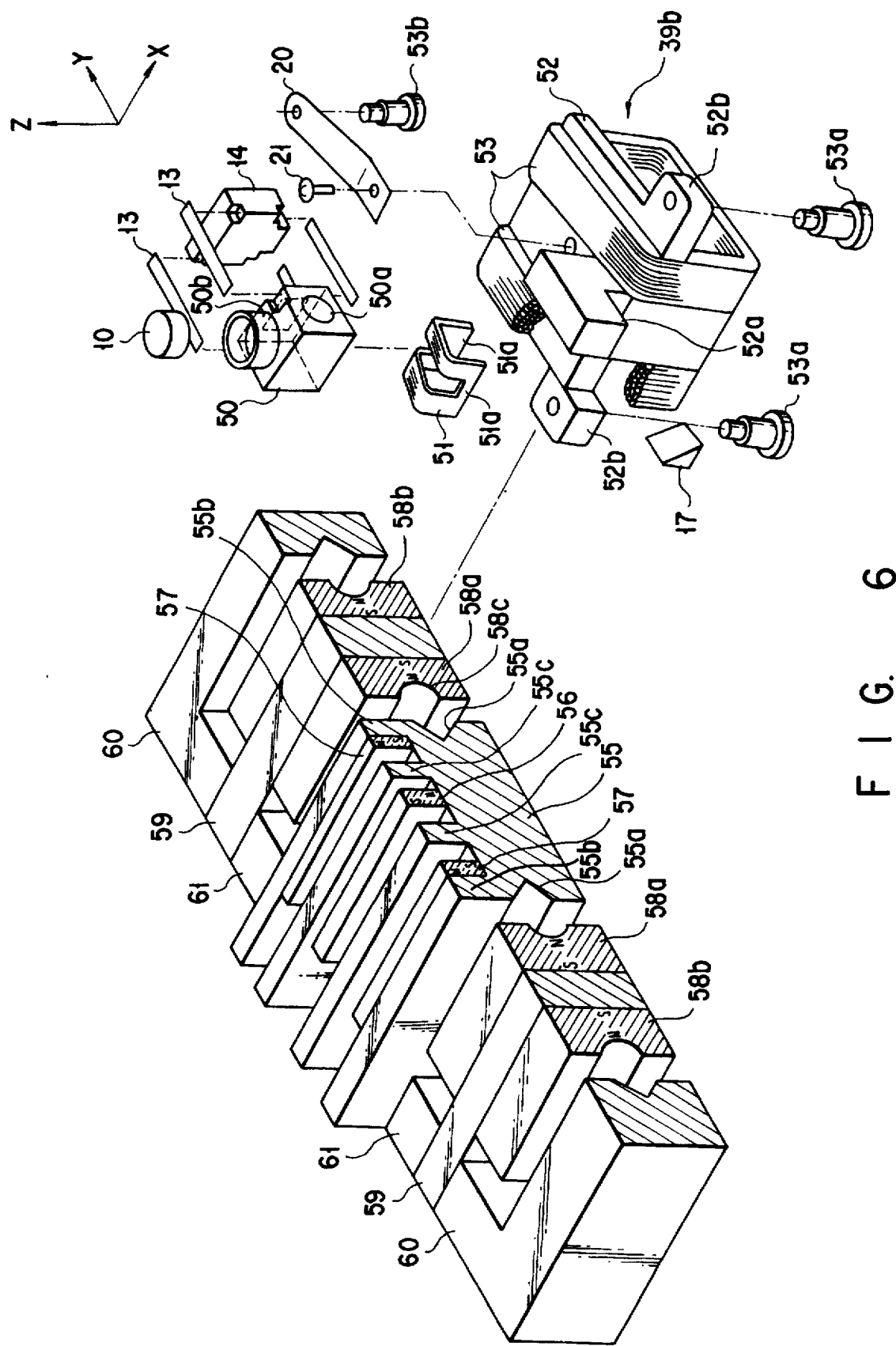
FIG. 6 is an exploded perspective view partially showing an optical pickup system according to the second embodiment of the present invention.

In the second embodiment, a U-shaped focus coil 51 is fixed to the bottom of the lens holder 50, as shown in FIG. 6. In the front wall of the lens holder 50 is formed a hole 50a for guiding a light beam from the fixed optical system 41 (see FIG. 1). A hole 50b is formed in the right wall of the lens holder 50. An arm 52a provided on the carriage 52 is inserted with a given ply in the hole 50b. The mirror 17 is secured to the left side of the distal end of the arm 52a in such a way as to reflect the light beam from the hole 50a toward the objective lens 10.

The fixing member 14 is fixed to the right side of the arm 52a. Carriage coils 53 are wound around the front and rear end portions of the carriage 52, with the axis along the X direction as the center. Two projections 52b are provided on the front and rear of the carriage 52, protruding forward and backward. In the projections 52b are formed vertical holes where bearings 53a are to be securely pressed.

The spring 20 has its proximal end fixed to nearly the center of the top of the carriage 52 by means of a screw 21. A pressure bearing 53b is fixed to the distal end of this spring 20. Each of bearings 53a and 53b has a rounded peripheral surface which constitutes a raceway surface.

Inserted in the carriage coil 53 is a yoke 59 having magnets 58a and 58b mounted on both sides of the center portion. Both ends of a U-shaped yoke 60 are securely fixed to the right sides of the front and rear portions of the yoke 59.

The yoke 59 is linked to a center yoke 55 by a yoke 61. On the right side of the yoke 55 is formed a V-shaped groove 55a extending in the tracking direction (X direction); this groove 55a serves as a guide to move the optical pickup in the tracking direction. On the left side of the magnet 58a is formed a U-shaped groove 58c to prevent the bearing 53 from contacting the magnet 58a.

Two sets of projections 55b and 55c extend on the top of the yoke 55 in the X direction. Two magnets 57 are securely fixed to the inner sides of the outer set of projections 55b. A magnet 56 is securely fixed on the top of the yoke 55 between the inner set of projections 55c. The magnets 56 and 57 are arranged so that the same poles face each other.

Figure 7:
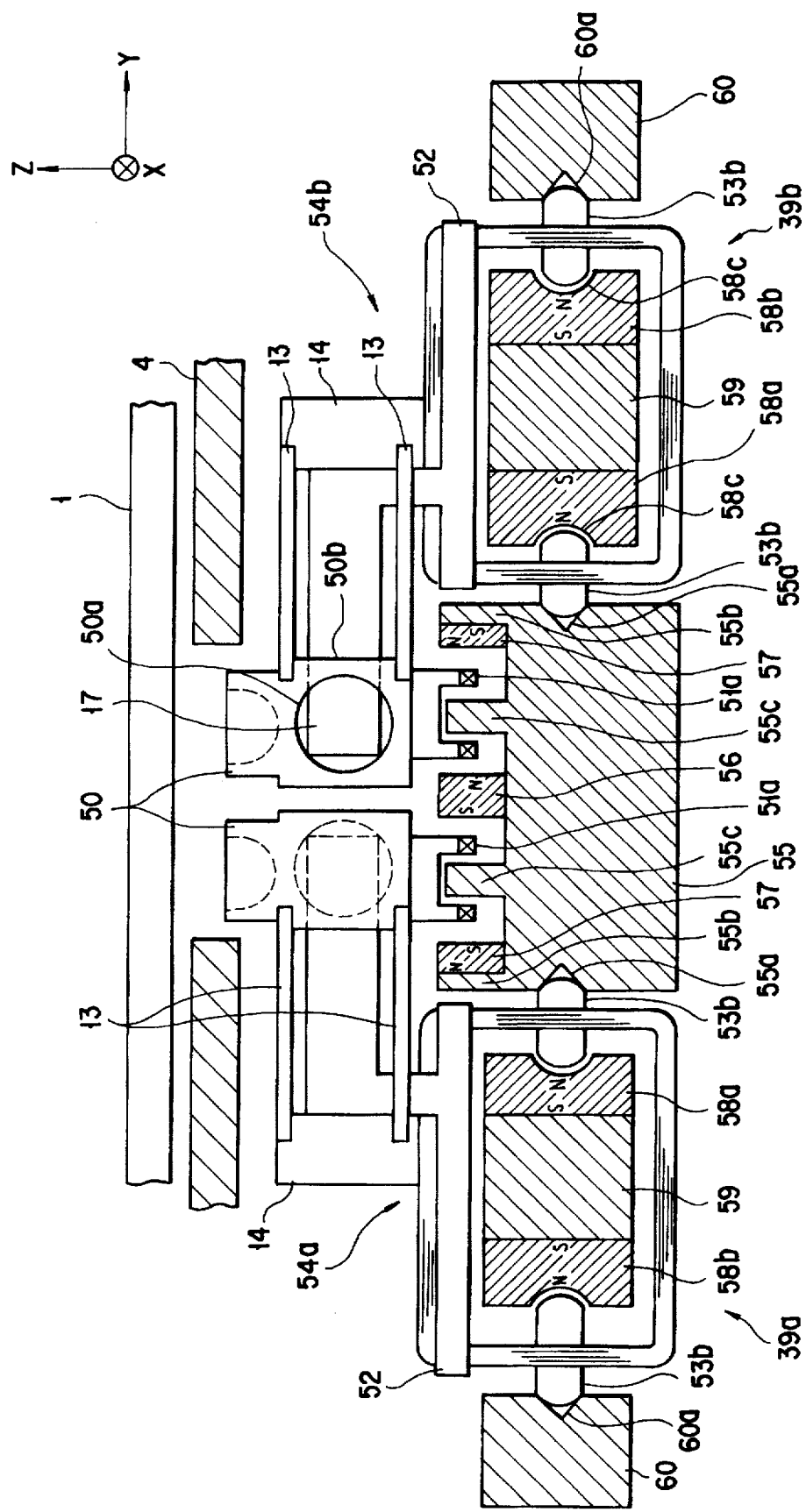
FIG. 7 is a cross section of the system shown in FIG. 6.

As shown in FIG. 7, a bent portion 51a of the focus coil 51 is located over the projection 55c. This bent portion 51a is positioned in magnetic gaps formed by the inner projections 55 of the yoke 55 and the magnet 56, and by the outer projections 55c and magnet 57.

Figure 8:
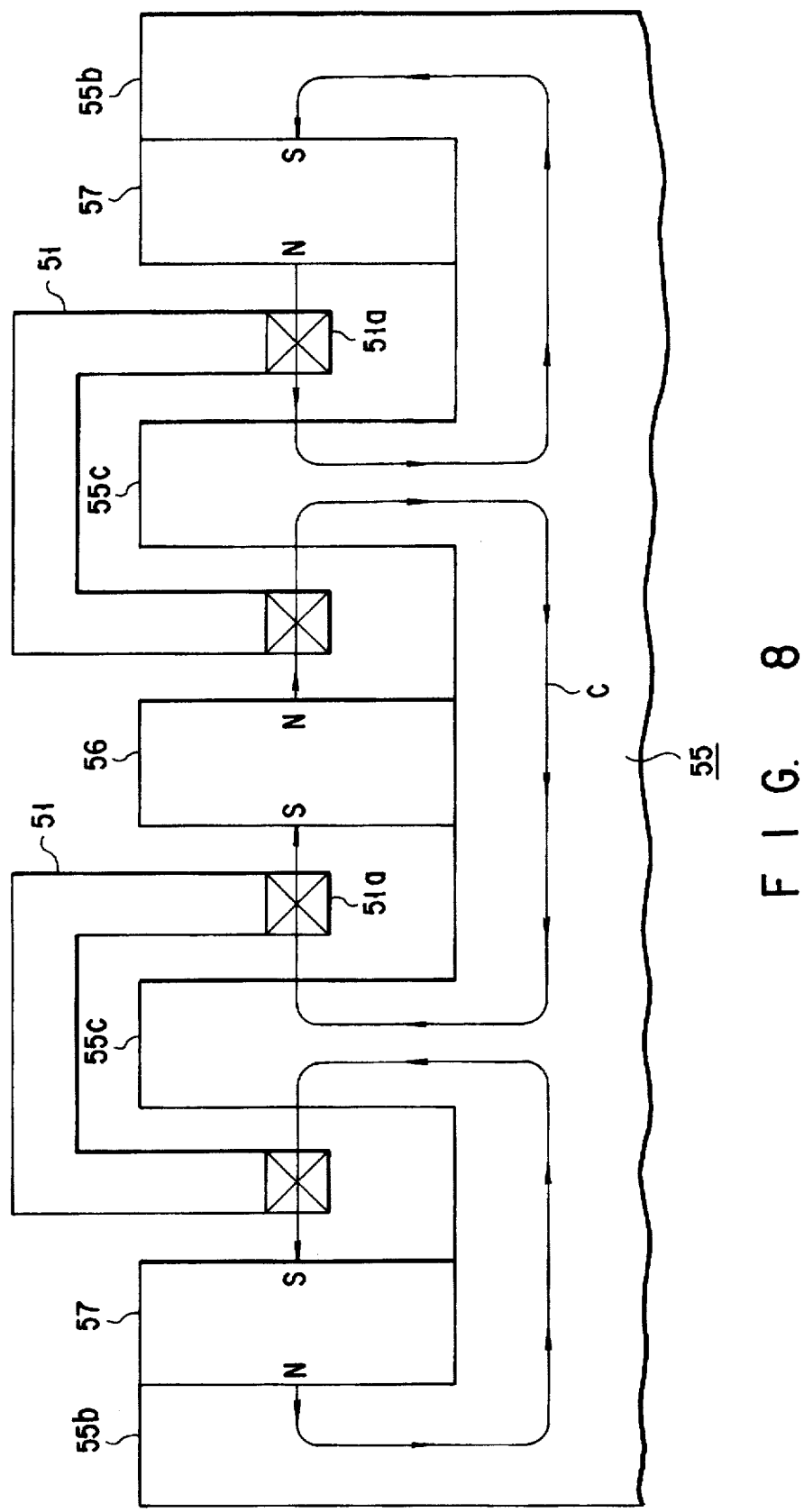
FIG. 8 is a view of a magnetic circuit which acts on a focus coil of the system shown in FIG. 6.

As shown in FIG. 8, the magnetic circuit C for the focus coil 51 is constituted by the path from the magnet 56, to the inner projections 55c of the yoke 55, to the yoke 55 itself, to the inner projections 55c, to the magnets 56 and 57, to the projections 55c, to the yoke 55, to the projections 55b, and to the magnet 57. The magnet 56 is commonly used to move two objective lenses in the focus direction. In FIG. 8, the hatching is omitted for diagrammatic simplification.

The magnetic circuit for the carriage coil is formed by the path from the magnet 58a, to the yoke 55, to the yoke 61, to the yoke 59, to the magnets 58a and 58b, to the yoke 60, to the yoke 59 and to the magnet 58b.

With the structure of the second embodiment, since no guide rail is present between two objective lenses 10, the objective lenses can be arranged closer to each other. This design feature can permit the optical pickup system to be applied to a cartridge having a smaller window. Further, the angular change to the tangential direction between when the objective lens is located inside the disk 1 and it is located outside the disk 1 becomes smaller, thus reducing a variation in the track error signal.

In addition, since the magnetic circuit for the focus coil is formed on the fixed portion, the optical pickup can be made lighter. Further, the yoke 55 serves as a guide member to guide the optical pickup in the X direction and as the magnetic circuit for the focus coil and carriage coil, thus reducing the total number of components required and thus contributing to downsizing of the system. Furthermore, as the bearing is designed to be positioned in a magnetic gap, the system can be made more compact, thus contributing to downsizing of the system in the height direction.

The third embodiment will now be described referring to FIGS. 9 to 11.

Figure 9:
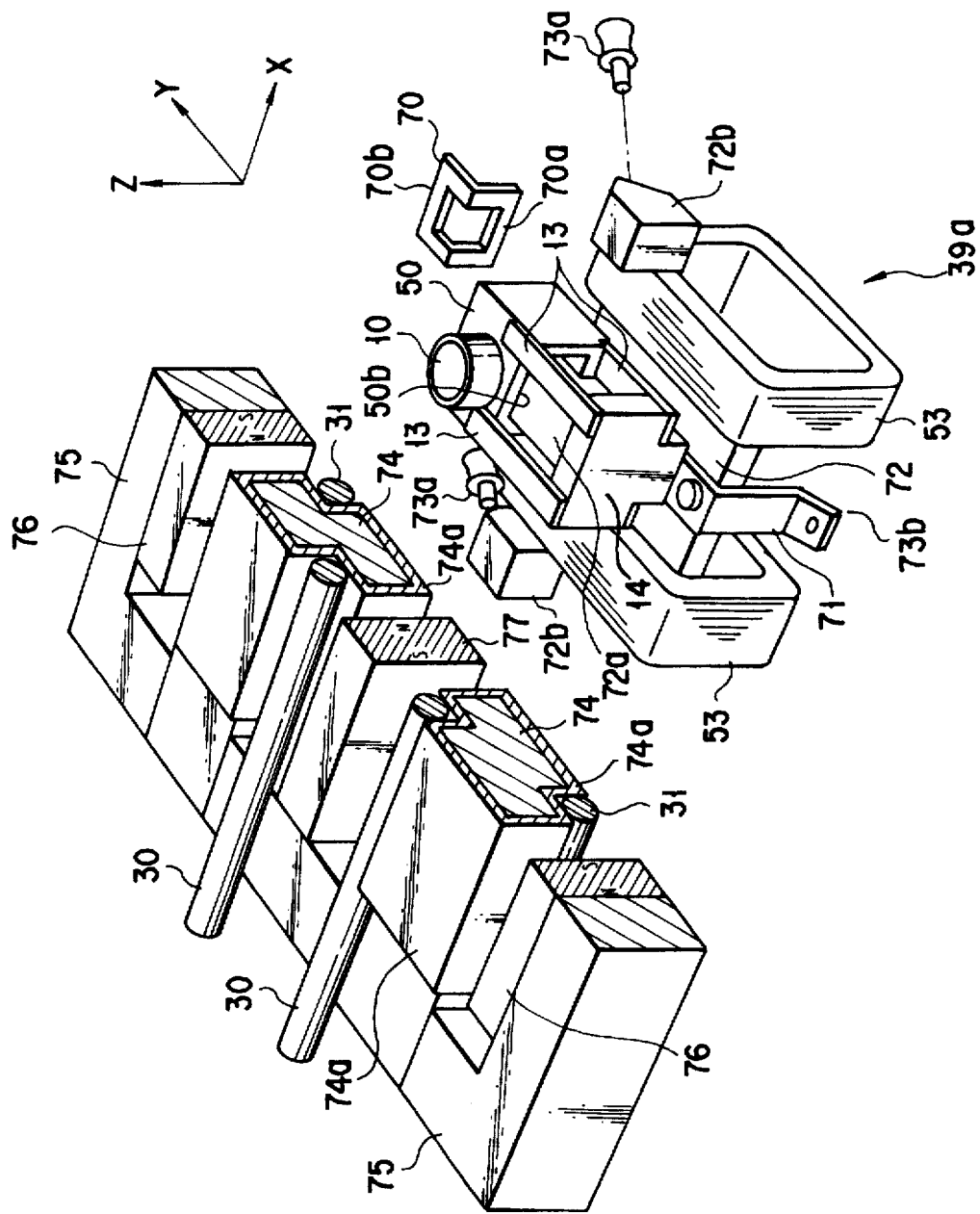
FIG. 9 is an exploded perspective view partially showing an optical pickup system according to the third embodiment of the present invention.
Figure 10:
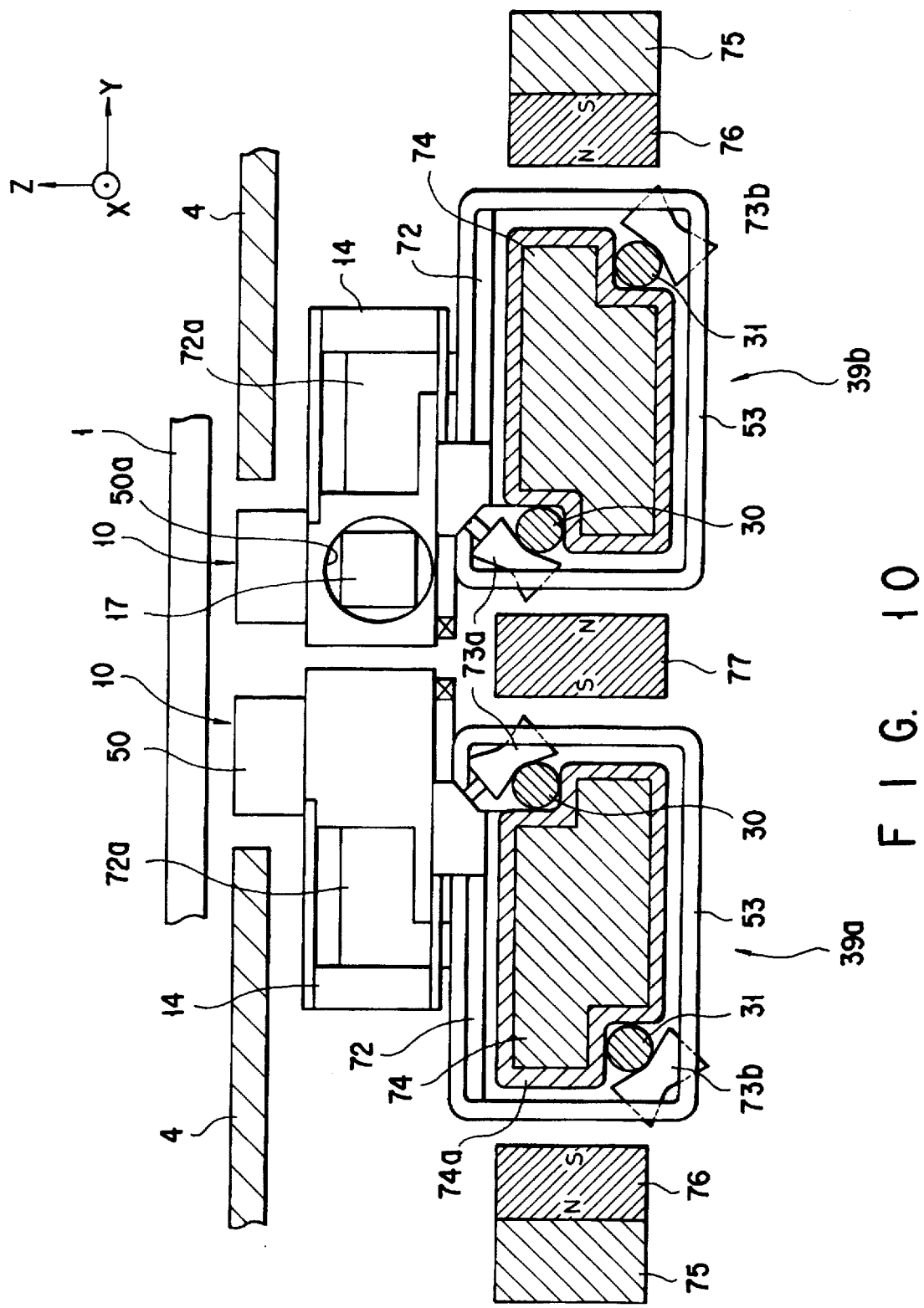
FIG. 10 is a side view of the system shown in FIG. 9.
Figure 14:
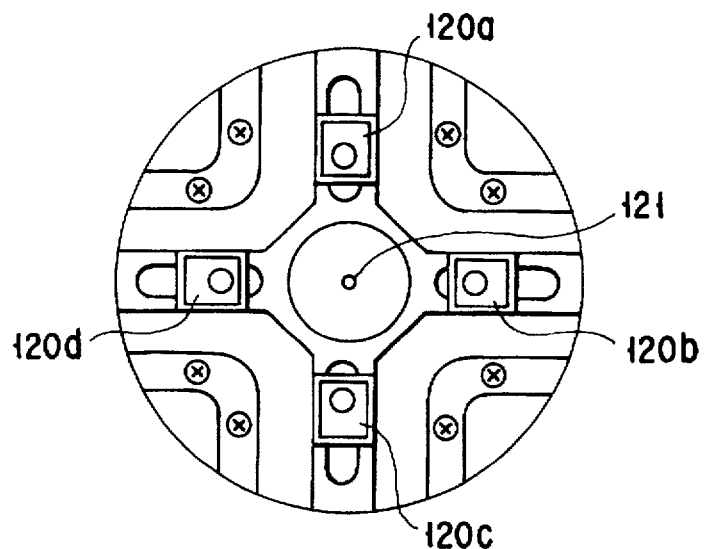
FIG. 14 is a top view showing a conventional optical pickup system.
Figure 15:
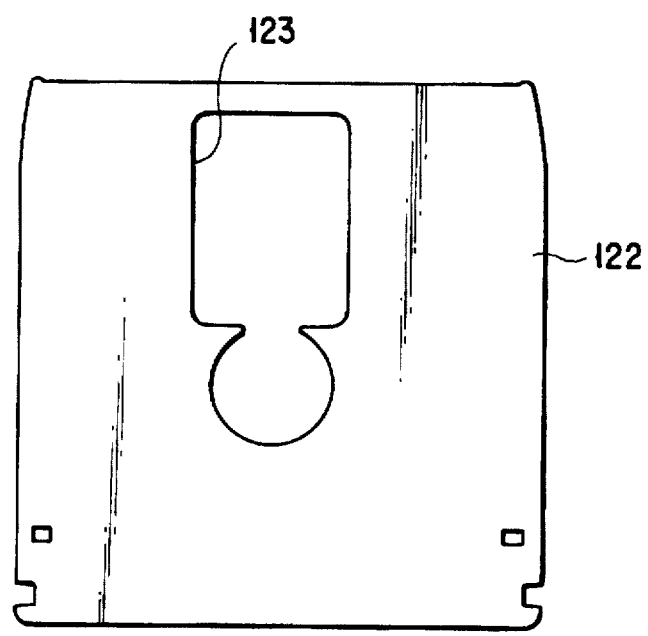
FIG. 15 is a top view of a typical cartridge for housing an optical disk.
Figure 16:
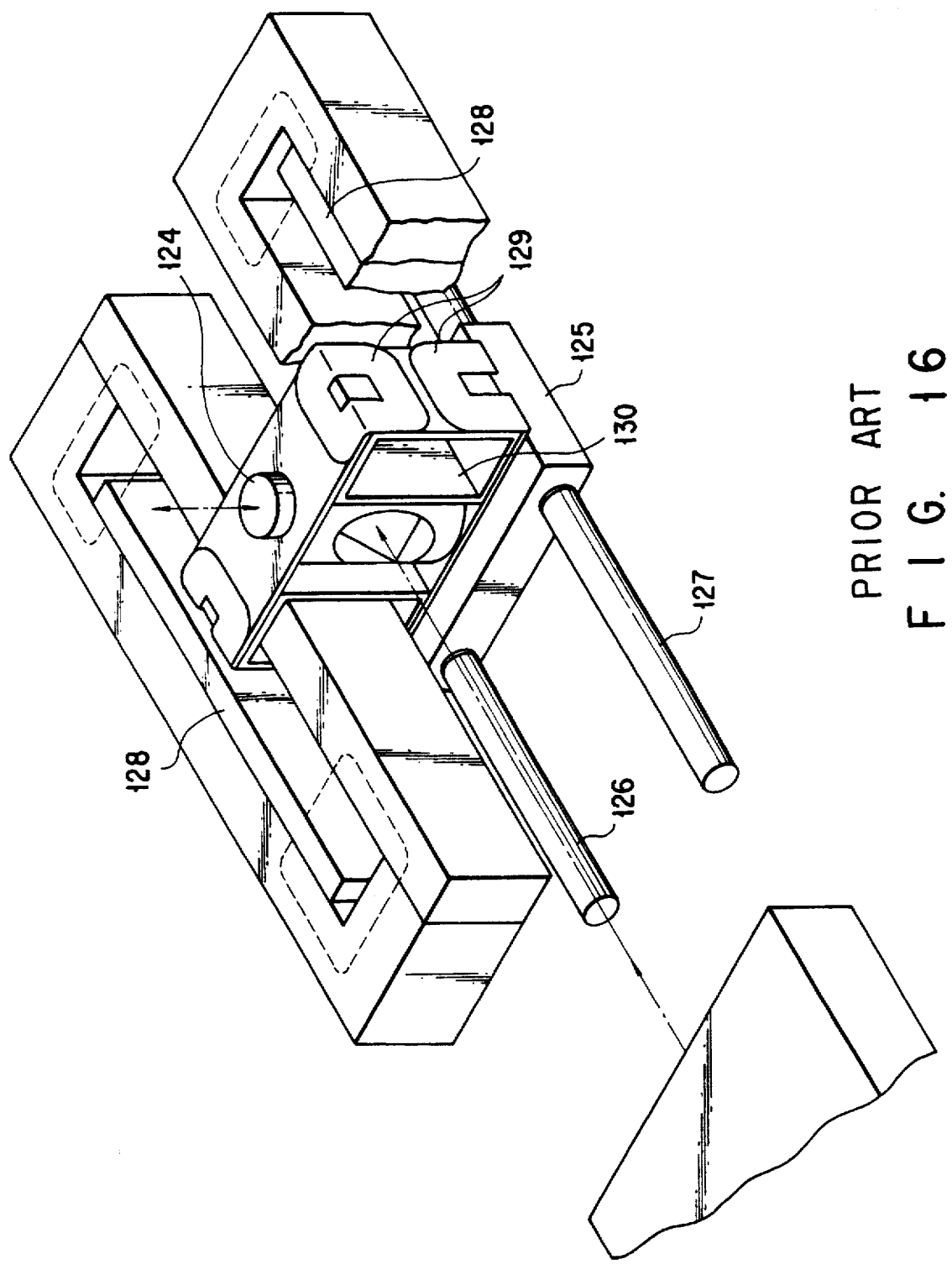
FIG. 16 is a perspective view of a conventional optical pickup.

In this embodiment an L-shaped focus coil 70 is attached to the bottom of a lens holder 50 as shown in FIG. 9. The base section of an arm 72a is attached to the top surface of a carriage 72. Fixed to the distal end of the arm 72a is a mirror 17 which is inserted in an opening 50b (see FIG. 4) provided in the lens holder 50. The mirror 17 guides a light beam from the fixed optical system to an objective lens 10 through a hole 50a formed in the rear surface of the lens holder 50. A fixing member 14 is attached to the left side of the proximal end of the arm 72a, and fixes a support spring 13 which supports the lens holder 50 to be slidable in the focus direction.

Bearing holding sections 72b are provided on the right sides of the front and rear ends of the carriage 72. Standard bearings 73a are pressed and fixed into the respective holding sections 72b so as to be inclined to the optical disk 1.

A spring 71 is fixed to the left side of the fixing member 14, and a pressure bearing 73b is securely pressed into the distal end of the spring 71 so as to face the reference bearings 73a. The spring 71 is positioned at the magnetic gap between an internal yoke 74 and a magnet 76, both to be described later.

On a base (not shown), the yoke 74 and an L-shaped yoke 75 are fixed. The yoke 74 and the longer side of the L-shaped yoke 75 extend in the X direction. Notches are formed at about 90° in opposite corners of the yoke 74 in the X direction. Guide rails 30 and 31 are positioned in the respective notches, and fixed to a base (not shown). The internal yoke 74 is covered by a short ring 74a made of a copper pipe. Inductance of a carriage coil around the short ring 74a is reduced to improve the response characteristic.

Two magnets 76 are attached respectively to the internal sides of the two external yokes 75. A magnet 77 is provided between the two internal yokes 74. These three magnets 75 and 77 are located with the same poles facing each other.

The two bearings 73a abut on the guide rail 30 and the two bearings 73b abut upon the guide rail 31, so that a movable section including the objective lens is supported by the guide rails. Though not shown in FIG. 10, the center of gravity of the optical pickup 39a is positioned in the same manner as in the first embodiment, i.e., at the point where the line connecting the two acting points of the carriage coil 53 crosses the line connecting the guide axes of the respective guide rails 30 and 31. If the optical pickup 39a moves in the X direction, therefore, the rotational moment will not occur and the resonance will scarcely occur.

Magnetic lines of force which act on the focus coil 70 run opposite one another in portions 70a and 70b parallel to the X direction of the focus coil 70 as shown in FIG. 11. Forces generated in the portions 70a and 70b of the focus coil 70 both act in the Z direction. The direction and amount of a current flowing through the focus coil 70 are adjusted to perform focus control on the objective lens. If a current runs through the carriage coil 53, the current electromagnetically acts on the magnetic fields of the magnets 76 and 77 to generate X-directional force in the carriage coil 53, so that the carriage 72 moves along the guide rails 30 and 31. As described above, since the magnet is used commonly by the focus coil 70 and the carriage coil 53 of the two pickups 39a and 39b, the optical pickup system can become smaller in the Y direction.

In the third embodiment, since the focus coil is bent like an L shape to improve the rate of use, the efficiency is improved accordingly. Further, the pressure spring 71 is positioned in a magnetic gap in this embodiment, ensuring further miniaturization of the optical pickup system.

The fourth embodiment will be described referring to FIGS. 12 and 13.

As two optical pickups have almost the same structure also in this embodiment, only one of them will be described as a first optical pickup 39a in detail.

As shown in FIG. 12, the first optical pickup 39a has a lens holder 80 formed into a nearly box shape. Openings are formed in the top and bottom walls of the lens holder 80. In the top opening an objective lens 81 as an optical element is held. A pair of focus coils 82 wound in a rectangular shape with the horizontal axis as the center are secured to the front and rear faces of the lens holder 80. On the top and bottom faces of the lens holder 80, the front end portions of a pair of focus leaf springs 83 formed of a thin plate into a nearly U shape and flexible in the focus direction indicated by the arrow Z. The rear end portions of this pair of focus leaf springs 83 are respectively secured to the top and bottom of a holding member 84 having a parallelepiped shape.

This lens holder 80 is mounted on a carriage 85, which is formed in a nearly L shape in the horizontal plane as shown in FIG. 12. As a result, when two carriages 85 of this type are combined at the front and rear along the tracking direction while rotated 180 degrees horizontally and mutually, light spots irradiated from the objective lenses 81 mounted on those carriages 85 can be simultaneously positioned on the track 113 of the optical storage medium such as a magneto optical disk 112 shown in FIG. 13. How to mount the objective lens 81 on the carriage 85 will be described in detail later.

As shown in FIG. 12, a cube-shaped mirror mounting hole 86 is formed in the top, front right of the carriage 85. A mirror 87 having a reflection surface inclined forward about 45 degrees is fixed at the bottom of the mirror mounting hole 86. In the front right of the carriage 85, a circular first through hole 88 is formed, communicating with the mirror mounting hole 86 and penetrating in the X direction, so that light coming from the front hits the mirror 87 through the mirror mounting hole 86.

A pair of yokes 89 are attached to the front and rear of the mirror mounting hole 8f6 at the top of the carriage 85. The yokes 89 are so fixed that a pair of bi-polar magnets face each other. A projection 91 protruding upward is provided in nearly the center of the top of the carriage 85. The aforementioned holding member 84 is attached to the rear side of the projection 91 in such a way that the lens holder 80 is freely inserted between the magnet pair 90. The lens holder 80 is supported on the carriage 85 via the pair of focus leaf springs 83, holding member 84 and projection 91, allowing the objective lens 81 to be movable in the focus direction.

In the aforementioned loose insertion of the lens holder 80, the upper portions of the focus coil pair 82 fixed to the front and rear of the lens holder 80 are set to correspond to the upper pole of the aforementioned magnet and the lower portions are set to correspond to the lower pole.

In the front left of the carriage 85 are formed a first guide hole 92 in which a guide rail 111 (shown in FIG. 13) is to be inserted and which penetrates in the X direction so as to permit the movement of the carriage 85 in the X direction, and a first opening 93 penetrating in the Z direction so as to be perpendicular to the first guide hole 92. The inner right side of the first opening 93 is shaped into a triangular projection whose top and bottom portions each have a single inclined surface 94. In the rear left of the carriage 85, a projection having an inclined surface 94 is formed in the same manner as the one formed in the inner right side of the first opening 93, those projections being arranged in parallel to each other at the front and rear portions. A shaft 96 of a bearing 95 that effect smooth movement of the carriage 85 in the X direction is securely pressed in the top and bottom inclined surfaces 94 of those projections, the shaft 96 having a rotatable roller.

In the rear right of the carriage 85 are formed a second guide hole 97 which penetrates in the X direction, and a second opening 98 penetrating in the Z direction. Formed on the inner left side of the second opening 98 is a projection which has the same inclined surfaces 94 as the first opening 93. A shaft 100 of a bearing 99 similar to the bearing 95 is securely pressed in the upper inclined surface 94 of this projection. Below this bearing 99 is disposed a pressure bearing 101 having a rotatable shaft 102.

The shaft 102 of the pressure bearing 101 is fixed to the upward-bent, right tip portion of a pressure spring 103 which is made of a thin plate and urges the pressure bearing 101 upward. This pressure spring 103 is attached to the bottom of the carriage 85 by means of screws 104. As the pressure bearing 101 is urged upward by the pressure spring 103 in this manner, it is possible to prevent jolting movement of the carriage 85 in the X direction.

On the left side of the second guide hole 97, a second through hole 105 extending parallel thereto is formed in the carriage 85. This through hole 105 is the space to form an optical path to guide light from a light source to the objective lens 81. In the structure shown in FIG. 13, only the second optical pickup 39b is used as space for forming the optical path.

A carriage coil 106 wound in a rectangular shape with the axis along the X direction as the center is fixed to either side of the carriage 85.

As shown in FIG. 13, the optical pickup system according to this embodiment has two optical pickups, i.e., the first optical pickup 39a and second optical pickup 39b. The second optical pickup 39b is designed quite the same as the above-described first optical pickup 39a except that the reflection surface of its mirror 87 is turned 180 degrees away from that of the first optical pickup 39a. The structure of this optical pickup system will now be described referring to FIG. 13.

A pair of outer yokes 108 extending in the X direction are secured to both sides of the rectangular deck base 107. On the opposite faces of the outer yoke pair 108 are formed recesses which have lengths corresponding to the moving strokes of the two optical pickups 39a and 39b, with a single-pole magnet 109 being fixed to the bottom of each recess.

Inner yokes 110 extending parallel to the outer yoke pair 108 are respectively fixed to the yokes 108 in such a way that the magnets 109 are sandwiched between the yokes 108 and 110. Each inner yoke 110 has a diameter slightly smaller than the winding inner diameter of the carriage coil 106. Between the inner yokes 110, the two guide rails 111 extending in the X direction are fixed on the deck base 107.

Those guide rails 111 are loosely inserted in the first and second guide holes (denoted by numerals 92 and 97 in FIG. 2) of the two optical pickups 39a and 39b, and the inner yokes 110 are loosely inserted in the carriage coils 106. As the rotatable bearings 95, 99 and 101 abut on the guide rails 111, the two optical pickups 39a and 39b can move in the X direction.

In other words, those carriages 85, bearings 95, 99 and 101, and guide rails 111 constitute guide means for guiding the optical pickups 39a and 39b so as to move in the X direction. The carriage coils 106, outer yokes 108, magnets 109, and inner yokes 110 constitute moving means for moving the optical pickups 39a and 39b in the tracking direction.

One of those optical pickups, i.e., the second optical pickup 39b, is located forward in the X direction or tracking direction to the first optical pickup 39a. When the optical pickups 39a and 39b come closest to each other as shown in FIG. 13, the light spots irradiated by the objective lenses 81 will lie on the same predetermined track 113 on the magneto optical disk 112 at a time.

A motor 114 for rotating the magneto optical disk 112 clockwise in the diagram is located on the deck base 107 at the rear of the first optical pickup 39a. On the opposite side of the motor 114, i.e., at the front of the deck base 107, two fixed optical systems 115a and 115b, which have optical components (not shown), such as a light source, a beam splitter, a photosensor, and a galvano mirror, and irradiate light toward the optical pickups 39a and 39b respectively, are mounted.

The action of the thus constituted optical pickup system according to this embodiment will be described below.

To begin with, the optical path of the optical pickup system will be discussed.

In FIG. 13, light 116a coming from the fixed optical system 115a passes the second through hole 105 of the second optical pickup 39b, and enters the first through hole 88 of the first optical pickup 39a to be reflected upward by the mirror (denoted by numeral 87 in FIG. 12). The reflected light is focused via the objective lens 81, forming a light spot on a given track on the magneto optical disk 112. Then, the light reflected by the magneto optical disk 112 returns to the fixed optical system 115a, taking the reverse route.

Light 116b coming from the fixed optical system 115b passes the first through hole 88 of the second optical pickup 39b, and is reflected upward by the mirror (denoted by numeral 87 in FIG. 12). The reflected light is focused via the objective lens 81, forming a light spot on a given track on the magneto optical disk 112. Then, the light reflected by the magneto optical disk 112 returns to the fixed optical system 115b, taking the reverse route.

Now the action of the moving means that moves the objective lens 81 will be described.

When a focus servo current flows through the focus coil 82, this current electromagnetically acts on the magnetic field generated by the magnet 90 to generate force in the focus direction (Z direction), moving the objective lens 81 in the focus direction.

When a tracking servo current flows through the carriage coil 106, this current electromagnetically acts on the magnetic field generated by the magnet 109 to generate force in the tracking direction (X direction), moving the carriage 85 together with the objective lens 81 in the tracking direction.

Magnetic field generating means (not shown) which can generate magnetic fields in two directions in the Z direction are provided on the opposite side of the objective lens 81 of each optical pickup 39a, 39b to the magneto optical disk 112.

When the magneto optical disk 112 is loaded into an information recording/reproducing apparatus in which the optical pickup system of this embodiment is used, particularly in an information recording/reproducing apparatus which performs both information recording and reproduction to the magneto optical disk 112, information on two tracks on the magneto optical disk 112, for example, two control tracks (not shown) respectively located at the inner peripheral side (rear in the diagram) and the outer peripheral side, can be reproduced or erased simultaneously. The first optical pickup 39a located at the rear accesses the inner control track to reproduce or erase information on that track. At the same time, the second optical pickup 39b located at the front accesses the outer control track to reproduce or erase information on that track. In this manner, two optical pickups 39a and 39b separately access two tracks to reproduce or erase information on two tracks at a time.

In standby mode, the first optical pickup 39a is positioned at ¼ of all the tracks from the innermost track, and the second optical pickup 39b is positioned at ¼ of all the tracks from the outermost track. In this manner, the maximum access distance when a target track is specified becomes ¼ of all the tracks. In this case, if the optical pickups are to be positioned to target only the information-carrying portion, the maximum access distance becomes shorter.

In reproducing or erasing information on a single track, the optical pickup closer to this track accesses it to do the job.

In recording information on two tracks, two optical pickups 39a and 39b simultaneously erase, record or verify information on separate tracks. Therefore, this optical pickup system can execute recording in half the time needed for the optical pickup system which uses a single optical pickup.

In recording information on a single track, both optical pickups 39a and 39b access that track simultaneously. First, in the first turn of the magneto optical disk 112 the second optical pickup 39b having the objective lens 81 located forward in the rotational direction (clockwise in the diagram) of the disk 112 erases the information on that track. At the same time, the first optical pickup 39a records information on that track. In the second turn, the first optical pickup 39a verifies the information. At this time, the second optical pickup 39b is ready for the next action to the next track.

Alternately, erasing may be done in the first turn and recording and verifying may be executed simultaneously in the second turn. With this method, the disk has only to turn twice for information recording on one track.

While one objective lens is provided for one AC voltage and this objective lens forms a single light spot in this embodiment, multiple objective lenses may be provided for one optical pickup, or multiple light spots may be formed by a single objective lens, thus ensuring faster recording/reproduction.

All the optical systems may be provided in an optical pickup.

The optical pickup system as designed according to this embodiment will have the following advantages.

1. Two optical pickups are designed quite the same except that the reflection surfaces of the mirrors are turned 180 degrees away from each other.
2. Since two optical pickups share the guide rails and magnetic circuit, requiring fewer components, which contributes to lower production cost and downsizing of the system.
3. As the carriage coils of two optical pickups are so arranged that they can come close to each other when the optical pickups are positioned parallel to each other, the magnet of the magnetic circuit in use can be minimized, further contributing to downsizing of the system.

Although two optical pickups are used in the individual embodiments of the present invention described above, the quantity is not limited to that number as long as they are two or greater in number. The positions of the guide rails, and the positions of the coils for moving the movable section may be changed as needed.

The optical pickup designed according to the present invention can quicken the recording/reproduction operation and increase the speed to access to a target track without reducing the driving sensitivity. As compared with the case where a plurality of optical elements are provided in a single focus actuator, or a plurality of focus actuators are provided in a single carriage, the weight of the movable section in the focus direction or tracking direction is light, ensuring higher driving sensitivity and contributing to downsizing of the system.

Further, even when multiple optical pickups are arranged along the tracks, they can be fitted in the window of a typical cartridge due to their smaller size. This optical pickup system can, therefore, be adapted to record information on or reproduce it from an information storage medium housed in a typical cartridge.

Additional advantages and modifications will readily occur to those skilled in the art. Therefore, the invention in its broader aspects is not limited to the specific details, and representative systems shown and described herein. Accordingly, various modifications may be made without departing from the spirit or scope of the general inventive concept as defined by the appended claims and their equivalents.

What is claimed is:

1. An optical pickup system for optically picking up information from one of a plurality of tracks arranged on a side surface of a disc-type optical storage medium and extending in a circumferential direction, through an opening in a cartridge which extends from a center portion of the optical storage medium in one radial direction thereof, the optical storage medium being housed in the cartridge, the optical pickup system comprising:

first and second optical pickups arranged side by side along one of the tracks of the optical storage medium such that said first and second optical pickups face the side surface of the optical storage medium through the opening of the cartridge, each of said first and second optical pickups including an optical element for emitting light on said one of the tracks to form a beam spot on the one of the tracks;

optical element-moving means for moving the optical elements of the first and second optical pickups independently of each other in a focus direction perpendicular to the side surface of the optical storage medium;

pickup supporting means for supporting said first and second optical pickups such that said first and second optical pickups are movable independently of each other in a tracking direction, in which the tracks are arranged, along the one radial direction of the optical storage medium; and pickup moving means for moving said first and second optical pickups independently of each other in the tracking direction, wherein:

said pickup moving means includes first, second and third driving elements which are arranged along the one side surface of the optical storage medium in a tangential direction perpendicular to the tracking direction, and which extend parallel to each other in the tracking direction;

the first driving element is disposed in association with said first optical pickup and designed to drive only said first optical pickup by use of a magnetic force, the second driving element is disposed in association with said first and second pickups and designed to drive said first and second optical pickups by use of a magnetic force; and the third driving means is disposed in association with said second optical pickup and designed to drive only said second optical pickup by use of a magnetic force;

the first driving element of said pickup moving means is located opposite to said second optical pickup with reference to said first optical pickup;

the second driving element of said pickup moving means is located between said first and second optical pickups; and the third driving element of said pickup moving means is located opposite to said first optical pickup with reference to said second optical pickup;

wherein:

said pickup supporting means includes first to third guiding members which are arranged along the one side surface of the optical storage medium to separate from each other in a tangential direction perpendicular to the tracking direction, and which extend parallel to each other in the tracking direction;

the first guiding member is disposed in association with said first optical pickup and designed to guide said first optical pickup;

the second guiding member is disposed in association with said first and second optical pickups and designed to guide said first and second optical pickups;

the third guiding member is disposed in association with said second optical pickup and designed to guide said second optical pickup;

the first guiding member is located opposite to said second optical pickup with reference to said first optical pickup;

the second guiding member is located between said first and second optical pickups; and the third guiding member is located opposite to said first optical pickup with reference to said second optical pickup, and wherein:

the first driving element of said pickup moving means is located opposite to said second optical pickup with reference to said first optical pickup and in one of upper and lower regions which are respectively located above and below a first center-of-member connecting line connecting a center of a cross section of the first guiding member and a center of a cross section of the second guiding member;

the second driving element of said pickup moving means is located between said first and second optical pickups and in the other of the upper and lower regions with reference to the first center-of-member connecting line; and the third driving element of said pickup moving means is located opposite to said first optical pickup with reference to said second optical pickup and in one of upper and lower regions which are respectively located above and below a second center of member connecting line connecting a center of a cross section of the second guiding member and the center of the cross section of the third guiding member, the third driving element being opposite to the second driving element with reference to the second center-of-member connecting line.

2. An optical pickup system according to claim 1, wherein:

an intersection of the first center-of-member connecting line and a first drive-force-applied-center connecting line connecting a drive-force-applied center of said first optical pickup onto which the first driving element applies a driving force and another drive-force-applied center of said first optical pickup on which the second driving element applies a driving force, is located in a cross section of said first optical pickup; and an intersection of the second center-of-member connecting line and a second drive-force-applied-center connecting line connecting a drive-force-applied center of said second optical pickup onto which the second driving element applies a driving force and another drive-force-applied center of said second optical pickup onto which the third driving element applies a driving force, is located in a cross section of said second optical pickup.

3. An optical pickup system according to claim 2, wherein the intersection of the first center-of member connecting line and the first drive-force-applied center connecting line is located in a center of gravity of said first optical pickup, and the intersection of the second center-of-member connecting line and the second drive-force-applied-center connecting line is located in a center of gravity of said second optical pickup.

4. An optical pickup system according to claim 2, wherein:

a distance between the first guiding member and the side surface of the optical storage medium in the focus direction is substantially equal to a distance between the third guiding member and the side surface of the optical storage medium in the focus direction;

a distance between the second guiding member and the side surface of the optical storage medium in the focus direction differs from each of the distance between the first guiding member and the side surface of the optical storage medium in the focus direction and the distance between the third guiding member and the side surface of the optical storage medium in the focus direction;

a distance between the first driving element and the side surface of the optical storage medium in the focus direction is substantially equal to a distance between the third driving element and the side surface of the optical storage medium in the focus direction; and a distance between the second driving element and the side surface of the optical storage medium in the focus direction differs from each of the distance between the first driving element and the side surface of the optical storage medium in the focus direction and the distance between the third driving element and the side surface of the optical storage medium in the focus direction.

5. An optical pickup system according to claim 4, wherein:

the distance between the second guiding member and the side surface of the optical storage medium in the focus direction is smaller than each of the distance between the first guiding member and the side surface of the optical storage medium in the focus direction and the distance between the third guiding member and the side surface of the optical storage medium in the focus direction; and the distance between the second driving element and the side surface of the optical storage medium in the focus direction is greater than each of the distance between the first driving element and the side surface of the optical storage medium in the focus direction and the distance between the third driving element and the side surface of the optical storage medium in the focus direction.

6. An optical pickup system according to claim 5, wherein the first to third driving elements are located between the second guiding member and the first and third guiding members in the focus direction.

7. An optical pickup system according to claim 1, wherein:
   the first driving element includes a first magnet located opposite to said second optical pickup with reference to said first optical pickup and in the one of the upper and lower regions with reference to the first center-of-member connecting line, and extending along the first guiding member in parallel with the first guiding member;
   the second driving element includes a second magnet located between said first and second pickups and in the other of the upper and lower regions with respect to the first center-of-member connecting line and in the other of the upper and lower regions with respect to the second center-of-member connecting line, and extending along the second guiding member in parallel with the second guiding member; and
   the third driving element includes a third magnet located opposite to said first optical pickup with reference to said second optical pickup and in the one of the upper and lower regions with reference to the second center-of-member connecting member, the third magnet being located opposite to the second driving element with reference to the second center-of-member connecting line and extending along the third guiding member in parallel with the third guiding member.

8. An optical pickup system according to claim 1, wherein:
   said first and second optical pickups are substantially identical to each other in structure, shape and dimensions; and
   said first and second pickups are supported adjacent to each other along the side surface of the optical storage medium in the tangential direction by said pickup supporting means such that said first and second pickups are rotated relative to each other by 180°.

9. An optical pickup system for optically picking up information from one of a plurality of tracks arranged on a side surface of a disc-type optical storage medium and extending in a circumferential direction, through an opening in a cartridge which extends from a center portion of the optical storage medium in one radial direction thereof, the optical storage medium being housed in the cartridge, the optical pickup system comprising:
   first and second optical pickups arranged side by side along one of the tracks of the optical storage medium such that said first and second optical pickups face the side surface of the optical storage medium through the opening of the cartridge, each of said first and second optical pickups including an optical element for emitting light on the one of the tracks to form a beam spot on the one of the tracks;
   optical element-moving means for moving the optical elements of the first and second optical pickups independently of each other in a focus direction perpendicular to the side surface of the optical storage medium;
   pickup supporting means for supporting said first and second optical pickups such that said first and second optical pickups are movable independently of each other in a tracking direction, in which the tracks are arranged, along the one radial direction of the optical storage medium;
   pickup moving means for moving said first and second optical pickups independently of each other in the tracking direction, said pickup moving means includes first and second driving elements which are located along the side surface of the optical storage medium to separate from each other in a tangential direction perpendicular to the tracking direction, and extend parallel to each other in the tracking direction, the first driving element being disposed in association with the first optical pickup and designed to drive said first optical pickup by use of a magnetic force;
wherein:
   said optical element-moving means includes first, second and third magnetic members, the first magnetic member is disposed in association with said first optical pickup and designed to drive the optical element of said first optical pickup by use of a magnetic force, the second magnetic member is disposed in association with said first and second optical pickups and designed to drive the optical elements of said first and second optical pickups by use of a magnetic force, and the third magnetic member is disposed in association with said second optical pickup and designed to drive the optical element of said second optical pickup by use of a magnetic force;
   wherein each of the first and second driving elements of said pickup moving means include a magnetic yoke extending along the side surface of the optical storage medium in the tracking direction and an electromagnetic coil arranged on each of said first and second optical pickups such that the electromagnetic coil is movable in a direction in which the magnetic yoke extends corresponding to the electromagnetic coil; and
wherein:
   the magnetic yoke of the first driving element of said pickup moving means includes:
      an insertion portion inserted in a center hole of the electromagnetic coil of said first optical pickup;
      a middle portion located outside of both of the center holes of the electromagnetic coils of the first and second optical pickups and between said first and second optical pickups; and
      an outer portion located outside of the center hole of the electromagnetic coil of said first optical pickup and opposite to the middle portion with reference to the insertion portion, the insertion portion being provided with a pair of magnets which respectively face the middle portion and the outer portion, and
   wherein the magnetic yoke of the second driving element of said pickup moving means includes:
      an insertion portion inserted in a center hole of the electromagnetic coil of said second optical pickup,
      a middle portion located outside of both of the center holes of the electromagnetic coils of the first and second optical pickups and between said first and second optical pickups, and
      an outer portion located outside of the center hole of the electromagnetic coil of said second optical pickup and opposite to the middle portion with reference to the insertion portion of the magnetic yoke of the second driving element, the insertion portion being provided with a pair of magnets which face the middle portion and the outer portion of the magnetic yoke of the second driving element.

10. An optical pickup system according to claim 9, wherein:
the second driving element is disposed in association with said second optical pickup and designed to drive said second optical pickup by use of a magnetic force; and
said optical element-moving means drives said first and second pickups independently of each other by a magnetic force in the tracking direction in cooperation with the first and second driving elements of said pickup moving means.

11. An optical pickup system according to claim 9, wherein the optical element-moving means includes:
a first magnet provided on the middle portion of the magnetic yoke of the first driving element of said pickup moving means;
a first electromagnetic coil provided on the optical element of said first optical pickup in association with the first magnet;
a second magnet provided on the middle portion of the magnetic yoke of the second driving element of said pickup moving means; and
a second electromagnetic coil provided on the optical element of said second optical pickup in association with the second magnet.

12. An optical pickup system according to claim 9, wherein the middle portion of the magnetic yoke of the first driving element of said pickup moving means and the middle portion of the magnetic yoke of the second driving element of said pickup moving means are integral with each other to form a single body, thereby connecting the magnetic yokes of the first and second driving elements of said pickup moving means to each other.

13. An optical pickup system according to claim 9, wherein said pickup supporting means includes:
a pair of first outer guiding grooves respectively formed in the insertion portion and outer portion of the magnetic yoke of the first outer driving element of said pickup moving means such that the first outer guiding grooves face each other and extend in the tracking direction;
a first groove-guided member provided on said first optical pickup fitted in the first outer guiding grooves and capable of being moved along the first outer guiding grooves;
a pair of first inner guiding grooves respectively formed in the insertion portion and middle portion of the magnetic yoke of the first driving element of said pickup moving means such that the first inner guiding grooves face each other and extend in the tracking direction;
a first inner groove-guided member provided on said first optical pickup fitted in the first inner guiding grooves and capable of being moved along the first inner guiding grooves;
a pair of second outer guiding grooves respectively formed in the insertion portion and outer portion of the magnetic yoke of the second driving element of said pickup moving means such that the second outer guiding grooves face each other and extend in the tracking direction;
a second outer groove-guided member provided on said second optical pickup fitted in the second outer guiding grooves and capable of being moved along the second guiding grooves;
a pair of second inner guiding grooves respectively formed in the insertion portion and middle portion of the magnetic yoke of the second driving element of said pickup moving means such that the second inner guiding grooves face each other and extend in the tracking direction; and
a second inner groove-guided member provided on said second optical pickup fitted in the second inner guiding grooves and capable of being moved along the second guiding grooves.

14. An optical pickup system for optically picking up information from one of a plurality of tracks arranged on a side surface of a disc-type optical storage medium and extending in a circumferential direction, through an opening in a cartridge which extends from a center portion of the optical storage medium in one radial direction thereof, the optical storage medium being housed in the cartridge, the optical pickup system comprising:
first and second optical pickups arranged side by side along one of the tracks of the optical storage medium such that said first and second optical pickups face the side surface of the optical storage medium through the opening of the cartridge, each of said first and second optical pickups including an optical element for emitting light on the one of the tracks to form a beam spot on the one of the tracks;
optical element-moving means for moving the optical elements of the first and second optical pickups independently of each other in a focus direction perpendicular to the side surface of the optical storage medium;
pickup supporting means for supporting said first and second optical pickups such that said first and second optical pickups are movable independently of each other in a tracking direction, in which the tracks are arranged, along the one radial direction of the optical storage medium;
pickup moving means for moving said first and second optical pickups independently of each other in the tracking direction,
wherein:
said optical element-moving means includes first, second and third magnetic members, the first magnetic member is disposed in association with said first optical pickup and designed to drive the optical element of said first optical pickup by use of a magnetic force, the second magnetic member is disposed in association with said first and second optical pickups and designed to drive the optical elements of said first and second optical pickups by use of a magnetic force, and the third magnetic member is disposed in association with said second optical pickup and designed to drive the optical element of said second optical pickup by use of a magnetic force;
wherein each of the first and second driving elements of said pickup moving means include a magnetic yoke extending along the side surface of the optical storage medium in the tracking direction and an electromagnetic coil arranged on each of said first and second optical pickups such that the electromagnetic coil is movable in a direction in which the magnetic yoke extends corresponding to the electromagnetic coil; and
wherein:
the magnetic yoke of the first driving element of said pickup moving means includes an insertion portion inserted in a center hole of the electromagnetic coil of said first optical pickup and an outer portion located outside of the center hole of the electromagnetic coil and opposite to said second optical pickup, the outer portion being provided with a magnet which faces the insertion portion; and the magnetic yoke of the second driving element of said pickup moving means includes an insertion portion inserted in a center hole of the electromagnetic coil of said second optical pickup and an outer portion located outside of the center hole of the electromagnetic coil and opposite to said first optical pickup, the outer portion being provided with a magnet which faces the insertion portion.

15. An optical pickup system according to claim 14, wherein said optical element-moving means comprises:

a magnet located between the electromagnetic coil of the first driving element and the electromagnetic coil of the second driving element;

a first electromagnetic coil provided on the optical element of said first optical pickup in association with the magnet thereof; and a second electromagnetic coil provided on the optical element of said second optical pickup in association with the magnet thereof.

16. An optical pickup system for optically picking up information from one of a plurality of tracks arranged on a side surface of a disc-type optical storage medium and extending in a circumferential direction, through an opening in a cartridge which extends from a center portion of the optical storage medium in one radial direction thereof, the optical storage medium being housed in the cartridge, the optical pickup system comprising:

first and second optical pickups arranged side by side along one of the tracks of the optical storage medium such that said first and second optical pickups face the side surface of the optical storage medium through the opening of the cartridge, each of said first and second optical pickups including an optical element for emitting light on the one of the tracks to form a beam spot on the one of the tracks;

optical element-moving means for moving the optical elements of the first and second optical pickups independently of each other in a focus direction perpendicular to the side surface of the optical storage medium;

pickup supporting means for supporting said first and second optical pickups such that said first and second optical pickups are movable independently of each other in a tracking direction, in which the tracks are arranged, along the one radial direction of the optical storage medium; and pickup moving means for moving said first and second optical pickups independently of each other in the tracking direction, wherein:

said pickup moving means includes guiding members and driving elements which are arranged along the one side surface of the optical storage medium to separate from each other in a tangential direction perpendicular to the tracking direction, and which extend parallel to each other in the tracking direction;

the guiding members are disposed in association with said first and second optical pickups and designed to guide said first and second optical pickups; and the driving elements are disposed in association with said first and second pickups and designed to drive said first and second optical pickups by use of a magnetic force; and wherein the number of the guiding member is two, the number of the driving elements is two, and the driving elements are located outside of both of the guiding members in the tangential direction and have a pair of electromagnetic coils provided on the first optical pickup outside of both of the guiding members in the tangential direction, a pair of electromagnetic coils provided on the second optical pickup outside of both of the guiding members in the tangential direction, and a pair of magnetic yokes arranged outside of both of the guiding members in the tangential direction and passing through center holes of the paired electromagnetic coils of the first and second optical pickups.

17. An optical pickup system according to claim 16, wherein:

said first and second optical pickups are substantially identical to each other in structure, shape and dimensions; and said first and second pickups are supported adjacent to each other along the side surface of the optical storage medium in the tangential direction by said pickup supporting means such that said first and second pickups are rotated relative to each other by 180°.

\* \* \* \* \*